United States Patent
Yunusov et al.

(10) Patent No.: US 11,824,809 B2
(45) Date of Patent: Nov. 21, 2023

(54) IN-PHASE AND QUADRATURE-PHASE TRACKING REFERENCE SIGNAL FOR AN UPLINK SHARED CHANNEL

(71) Applicant: QUALCOMM Incorporated, San Diego, CA (US)

(72) Inventors: David Yunusov, Holon (IL); Assaf Touboul, Netanya (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/146,105

(22) Filed: Jan. 11, 2021

(65) Prior Publication Data

US 2021/0218532 A1 Jul. 15, 2021

Related U.S. Application Data

(60) Provisional application No. 62/960,532, filed on Jan. 13, 2020.

(51) Int. Cl.
*H04L 5/00* (2006.01)

(52) U.S. Cl.
CPC ............ *H04L 5/0053* (2013.01); *H04L 5/006* (2013.01)

(58) Field of Classification Search
CPC ..... H04L 5/0053; H04L 5/006; H04L 5/0091; H04L 27/0014; H04L 5/0051
See application file for complete search history.

(56) References Cited

U.S. PATENT DOCUMENTS

| | | | | |
|---|---|---|---|---|
| 2004/0142667 A1* | 7/2004 | Lochhead | ............ | H04B 1/0475 455/114.2 |
| 2006/0182189 A1* | 8/2006 | Yu | .......................... | H04L 27/265 375/260 |
| 2013/0023226 A1* | 1/2013 | Dai | .......................... | H04B 1/28 455/302 |
| 2018/0254826 A1* | 9/2018 | Jungnickel | ............ | H04W 36/38 |
| 2019/0158242 A1* | 5/2019 | Wong | .................... | H04L 5/0048 |
| 2022/0053400 A1* | 2/2022 | Ljung | ............... | H04W 36/0058 |

* cited by examiner

*Primary Examiner* — Christine Ng
(74) *Attorney, Agent, or Firm* — Holland & Hart LLP

(57) ABSTRACT

Methods, systems, and devices for wireless communications are described. A user equipment (UE) may receive, from a base station, a configuration indicating a set of resources for a reference signal to track an in-phase and quadrature-phase imbalance of the UE. The set of resources may include a first subset of resources for transmitting the reference signal and a second subset of resources for a mirror image signal that is generated during upconversion of the reference signal. The UE may upconvert the reference signal to a set of subcarriers corresponding to the first subset of resources and transmit the upconverted reference signal on the first subset of resources. The base station may receive the reference signal and the mirror image signal and determine a signal adjustment for communications with the UE based on the received reference signal and the received mirror image signal.

30 Claims, 18 Drawing Sheets

IN-PHASE AND QUADRATURE-PHASE TRACKING REFERENCE SIGNAL FOR AN UPLINK SHARED CHANNEL

CROSS REFERENCE

The present application for patent claims the benefit of U.S. Provisional Patent Application No. 62/960,532 by YUNUSOV et al., entitled "IN-PHASE AND QUADRATURE-PHASE TRACKING REFERENCE SIGNAL FOR AN UPLINK SHARED CHANNEL," filed Jan. 13, 2020, assigned to the assignee hereof, and expressly incorporated by reference herein.

BACKGROUND

The present disclosure relates to wireless communications, and more specifically to an in-phase and quadrature-phase tracking reference signal for an uplink shared channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless device in a wireless communications system may experience some radio frequency impairments based on analog components of the wireless device. These radio frequency impairments may introduce a noise floor which distorts communication and affects communications quality even in ideal channel conditions.

SUMMARY

The described techniques relate to improved methods, systems, devices, and apparatuses that support an in-phase and quadrature-phase (IQ) tracking reference signal (IQTRS) for an uplink shared channel. Generally, the described techniques provide for compensating for IQ imbalances in a wireless communications system. Some wireless communications systems experience some radio frequency impairments, such as IQ imbalances, based on analog characteristics of wireless devices. These impairments may be independent of channel conditions and other over-the-air factors, such that a communications link between a user equipment (UE) and a base station in ideal channel conditions may still experience impairments due to IQ imbalances. IQ imbalances may be introduced when a transmitting device upconverts a baseband signal to a local oscillator frequency. When IQ paths are not matched by phase and amplitude, a mirrored image signal occurs at the negative spectrum (e.g., the negative local oscillator frequency). An amplitude and a phase of the IQ parts may determine a condition for an impairment. For example, if the IQ branches are aligned, there may not be any IQ impairments. If there are some phase or amplitude differences, there may be some IQ impairments, and a mirrored image signal may occur around the negative spectrum as well as some error vector magnitude (EVM) impact for the desired transmitted signal.

Techniques described herein support a reference signal which is transmitted and measured to compensate for some radio frequency impairments, such as IQ imbalances. By compensating for these impairments, a noise floor for the UE may be lowered, and the UE may be supported to communicate using higher modulations (e.g., higher quadrature amplitude modulation (QAM) constellations). In some cases, a base station receiving the reference signal may make signal adjustments (e.g., during decoding) based on the reference signal instead of performing expensive or time consuming transmit chain calibrations. Additionally, or alternatively, the base station may transmit a measurement report for the IQTRS. Techniques for configuring resources for the reference signal are described herein. In some cases, the UE may be allocated resources such that the base station can successfully filter the received signal to identify both the upconverted reference signal and a mirrored image signal, which may be measured and used to compensate for impairments of later signaling. For example, the UE may be allocated resources for the reference signal such that the image spectrum falls between the transmitted signal, where the mirror image signal falls on unoccupied or unused resource elements.

A method of wireless communication at a UE is described. The method may include receiving, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal, upconverting the reference signal to a set of subcarriers corresponding to the first subset of resources, and transmitting the upconverted reference signal on the first subset of resources.

An apparatus for wireless communication at a UE is described. The apparatus may include a processor, memory coupled with the processor, and instructions stored in the memory. The instructions may be executable by the processor to cause the apparatus to receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal, upconvert the reference signal to a set of subcarriers corresponding to the first subset of resources, and transmit the upconverted reference signal on the first subset of resources.

Another apparatus for wireless communication at a UE is described. The apparatus may include means for receiving, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal, upconverting the reference signal to a set of subcarriers corresponding to the first subset of resources, and transmitting the upconverted reference signal on the first subset of resources.

A non-transitory computer-readable medium storing code for wireless communication at a UE is described. The code may include instructions executable by a processor to receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal, upconvert the reference signal to a set of subcarriers corresponding to the first subset of resources, and transmit the upconverted reference signal on the first subset of resources.

Some examples of the method, apparatuses, and non-transitory computer-readable medium described herein may further include operations, features, means, or instructions for receiving a request from the base station to transmit the reference signal to track the in-phase and quadrature-phase imbalance, the upconverted reference signal transmitted based on receiving the request.

In some examples of the method, apparatuses, and non-transitory computer-readable medium described herein, the received request configures the UE to transmit the reference signal based on an uplink demodulation reference signal configuration.

Some examples of the method, apparatuses, and non-transitory computer-readable medium described herein may further include operations, features, means, or instructions for detecting a periodic trigger to transmit the reference signal to track the in-phase and quadrature-phase imbalance, the upconverted reference signal transmitted based on detecting the periodic trigger.

Some examples of the method, apparatuses, and non-transitory computer-readable medium described herein may further include operations, features, means, or instructions for receiving, from the base station, a measurement report for the reference signal in response to transmitting the upconverted reference signal.

Some examples of the method, apparatuses, and non-transitory computer-readable medium described herein may further include operations, features, means, or instructions for adjusting an antenna array of the UE or modifying a phase and amplitude in time domain processing, or both, based on the measurement report to compensate for the in-phase and quadrature-phase imbalance.

In some examples of the method, apparatuses, and non-transitory computer-readable medium described herein, the with the received configuration indicates a continuous allocation of frequency resources for the reference signal in the first subset of the set of resources, and a lack of frequency resources for the reference signal in the second subset of the set of resources.

In some examples of the method, apparatuses, and non-transitory computer-readable medium described herein, the set of resources includes resources for a demodulation reference signal, where the first subset of the set of resources includes a first portion of demodulation reference signal resources in an uplink channel and the second subset of the set of resources includes a second portion of the demodulation reference signal resources in the uplink channel.

In some examples of the method, apparatuses, and non-transitory computer-readable medium described herein, the first subset of the set of resources may be centered around an odd frequency offset.

In some examples of the method, apparatuses, and non-transitory computer-readable medium described herein, the first subset of resources may be interleaved with the second subset of resources.

In some examples of the method, apparatuses, and non-transitory computer-readable medium described herein, the reference signal may be asymmetrical around a local oscillator frequency of the UE.

In some examples of the method, apparatuses, and non-transitory computer-readable medium described herein, the upconverted reference signal may be transmitted on the first subset of resources using a set of antenna ports.

A method of wireless communication at a base station is described. The method may include transmitting, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE, receiving the reference signal on the first subset of resources and the mirror image signal on the second subset of resources, determining a signal adjustment for communications with the UE based on the received reference signal and the received mirror image signal, and decoding an uplink signal from the UE according to the determined signal adjustment.

An apparatus for wireless communication at a base station is described. The apparatus may include a processor, memory coupled with the processor, and instructions stored in the memory. The instructions may be executable by the processor to cause the apparatus to transmit, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE, receive the reference signal on the first subset of resources and the mirror image signal on the second subset of resources, determine a signal adjustment for communications with the UE based on the received reference signal and the received mirror image signal, and decode an uplink signal from the UE according to the determined signal adjustment.

Another apparatus for wireless communication at a base station is described. The apparatus may include means for transmitting, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE, receiving the reference signal on the first subset of resources and the mirror image signal on the second subset of resources, determining a signal adjustment for communications with the UE based on the received reference signal and the received mirror image signal, and decoding an uplink signal from the UE according to the determined signal adjustment.

A non-transitory computer-readable medium storing code for wireless communication at a base station is described. The code may include instructions executable by a processor to transmit, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE, receive the reference signal on the first subset of resources and the mirror image signal on the second subset of resources, determine a signal adjustment for communications with the UE based on the received reference signal and the received mirror image signal, and decode an uplink signal from the UE according to the determined signal adjustment.

Some examples of the method, apparatuses, and non-transitory computer-readable medium described herein may further include operations, features, means, or instructions for transmitting a request to the UE to transmit the reference signal to track the in-phase quadrature-phase imbalance, where the reference signal and the mirror image signal may be received based on transmitting the request.

In some examples of the method, apparatuses, and non-transitory computer-readable medium described herein, the transmitted request configures the UE to transmit the reference signal based on an uplink demodulation reference signal configuration.

Some examples of the method, apparatuses, and non-transitory computer-readable medium described herein may further include operations, features, means, or instructions for transmitting, to the UE, an indication of a periodic trigger for the UE to use to transmit the reference signal to track the in-phase and quadrature-phase imbalance, where the reference signal and the mirror image signal may be received based on the periodic trigger.

Some examples of the method, apparatuses, and non-transitory computer-readable medium described herein may further include operations, features, means, or instructions for transmitting a measurement report for the reference signal in response to receiving the reference signal and the mirror image signal.

Some examples of the method, apparatuses, and non-transitory computer-readable medium described herein may further include operations, features, means, or instructions for adjusting an antenna array of the base station or a phase and amplitude processing in the time domain, or both, based on the signal adjustment to compensate for the in-phase and quadrature-phase imbalance.

Some examples of the method, apparatuses, and non-transitory computer-readable medium described herein may further include operations, features, means, or instructions for applying the signal adjustment after a Fast Fourier Transform and prior to channel estimation.

Some examples of the method, apparatuses, and non-transitory computer-readable medium described herein may further include operations, features, means, or instructions for performing a channel estimation based on the received mirror image signal, where the signal adjustment may be based on the channel estimation.

Some examples of the method, apparatuses, and non-transitory computer-readable medium described herein may further include operations, features, means, or instructions for combining signals received at antennas of the base station associated with the UE prior to performing the channel estimation.

In some examples of the method, apparatuses, and non-transitory computer-readable medium described herein, the signals may be combined based on a signal-to-noise ratio (SNR) of the signals.

In some examples of the method, apparatuses, and non-transitory computer-readable medium described herein, the transmitted configuration indicates a continuous allocation of frequency resources for the reference signal in the first subset of the set of resources, and a lack of any frequency resources for the reference signal in the second subset of the set of resources.

In some examples of the method, apparatuses, and non-transitory computer-readable medium described herein, the set of resources includes resources for a demodulation reference signal, where the first subset of the set of resources includes a first portion of demodulation reference signal resources in an uplink channel and the second subset of the set of resources includes a second portion of the demodulation reference signal resources in the uplink channel.

In some examples of the method, apparatuses, and non-transitory computer-readable medium described herein, the first subset of the set of resources may be centered around an odd frequency offset.

In some examples of the method, apparatuses, and non-transitory computer-readable medium described herein, the first subset of resources may be interleaved with the second subset of resources.

In some examples of the method, apparatuses, and non-transitory computer-readable medium described herein, the reference signal may be asymmetrical around a local oscillator frequency of the UE.

DETAILED DESCRIPTION

Figure 1:
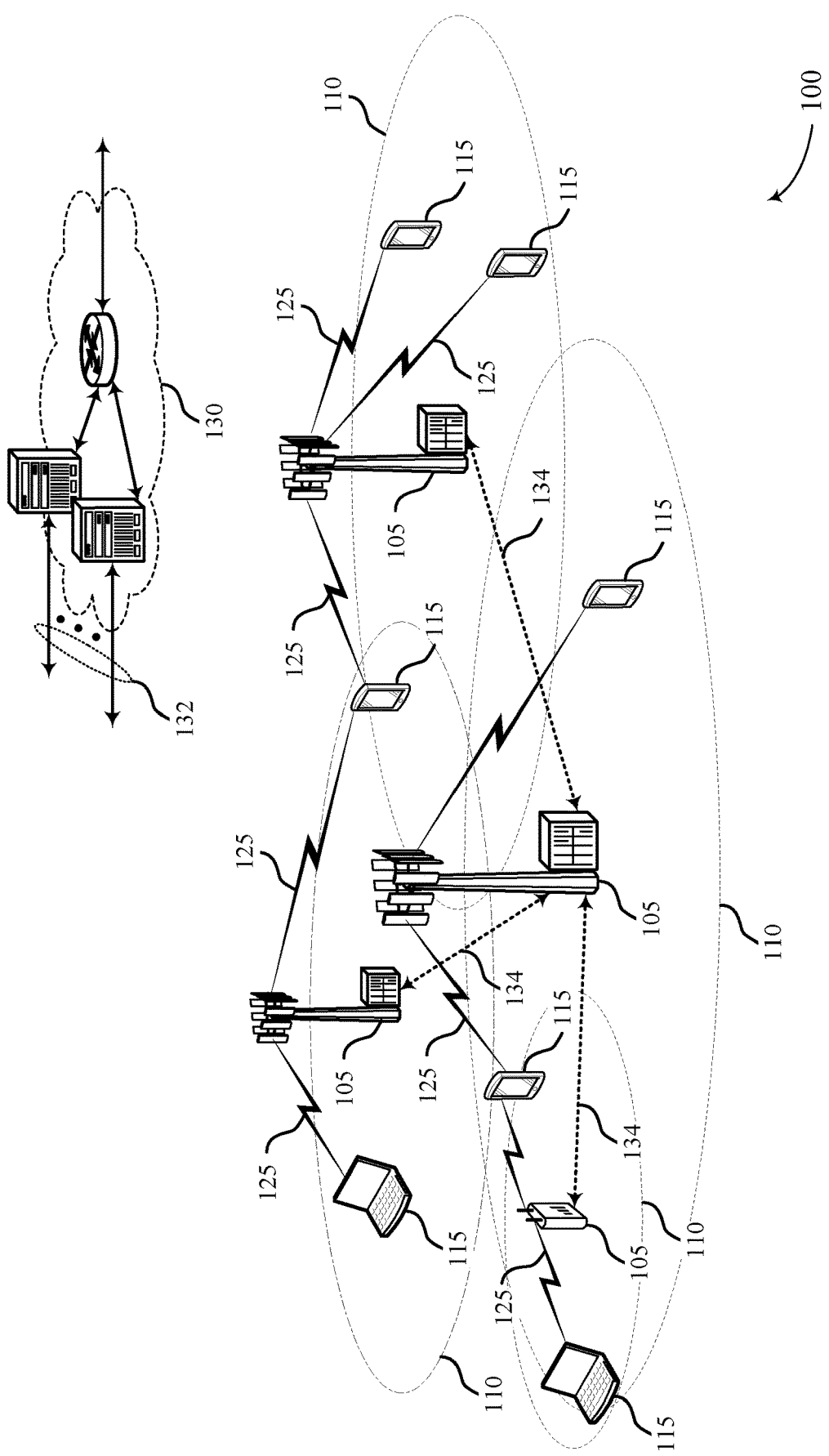
FIG. 1 illustrates an example of a system for wireless communications that supports an in-phase and quadrature-phase tracking reference signal for an uplink shared channel in accordance with aspects of the present disclosure.

A wireless communications system may experience some radio frequency impairments, such as in-phase and quadrature-phase (IQ) imbalances, based on analog characteristics of the devices in the wireless communications system. These impairments may be independent of channel conditions and other over-the-air factors, such that a communications link between a user equipment (UE) and a base station in ideal channel conditions may still experience impairments due to IQ imbalances. Distortion from the impairments may degrade performance and introduce a noise floor, which may limit the operational signal-to-noise ratio (SNR) at the receiver. These impairments may be more significant in systems with a high modulation and coding scheme (MCS), or systems with a high data rate or quadrature amplitude modulation (QAM), as these systems may have more stringent quality and reliability conditions.

Some radio frequency impairments, such as IQ imbalances, may be introduced when a transmitting device upconverts a baseband signal to a local oscillator frequency. When IQ paths are not matched by phase and amplitude, a mirrored image signal occurs at the negative spectrum (e.g., the negative local oscillator frequency). The mirrored image signal may affect the amplitude and phase of the waveform, resulting in distortion and a mean square error (MSE) from a constellation point that the signal is supposed to map to. The distortion may make it unclear which QAM constellation point the signal actually maps to. The constellation type may not affect the MSE caused by IQ impairments, so for higher order QAM constellations, the error from IQ impairment may become more significant as the constellation points become closer.

Techniques described herein support a reference signal which may be transmitted and measured to compensate for radio frequency impairments, such as IQ imbalances. The reference signal, in some cases referred to as an IQ tracking reference signal (IQTRS), may be transmitted to track IQ imbalances. By compensating for these impairments, a UE may be supported to communicate using higher order QAM constellations, as the UE may have a lower noise floor. In some cases, a base station receiving the reference signal may make signal adjustments (e.g., during decoding) based on the reference signal instead of performing expensive or time consuming transmit chain calibrations. Additionally, or alternatively, the base station may transmit a measurement report for the IQTRS. Techniques for configuring resources for the reference signal are described herein. The UE may be allocated resources such that the base station can successfully filter the received signal to identify both the upconverted reference signal and a mirrored image signal, which may be measured and used to compensate for impairments of later signaling. For example, the UE may be allocated resources for the reference signal such that the image spectrum falls between the transmitted signal, where the mirror image signal falls on unoccupied or unused resource elements.

Aspects of the disclosure are initially described in the context of a wireless communications system. Aspects of the disclosure are further illustrated by and described with reference to apparatus diagrams, system diagrams, and flowcharts that relate to an in-phase and quadrature-phase tracking reference signal for an uplink shared channel.

FIG. 1 illustrates an example of a wireless communications system 100 that supports an in-phase and quadrature-phase tracking reference signal for an uplink shared channel in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band.

The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems, such as the wireless communications system 100, may experience some radio frequency impairments based on analog characteristics of wireless devices. These impairments may be independent of channel conditions and other over-the-air factors, such that a communications link between a UE 115 and a base station 105 in ideal channel conditions may still experience impairments due to, for example, IQ imbalances. IQ imbalances may be introduced when a transmitting device upconverts a baseband signal to a local oscillator frequency. When IQ paths are not matched by phase and amplitude, a mirrored image signal occurs at the negative spectrum (e.g., the negative local oscillator frequency). The mirrored image signal may affect the amplitude and phase of the waveform, resulting in distortion to the waveform.

Techniques described herein support a reference signal which is transmitted and measured to compensate for some radio frequency impairments, such as IQ imbalances. By compensating for these impairments, a noise floor for the UE 115 may be lowered, and the UE 115 may be supported to communicate using higher QAM constellations. In some cases, a base station 105 receiving the reference signal may make signal adjustments (e.g., during decoding) based on the reference signal instead of performing expensive or time consuming transmit chain calibrations. Additionally, or alternatively, the base station 105 may transmit a measurement report for the IQTRS. Techniques for configuring resources for the reference signal are described herein. In some cases, the UE 115 may be allocated resources such that the base station 105 can successfully filter the received signal to identify both the unconverted reference signal and a mirrored image signal, which may be measured and used to compensate for impairments of later signaling. For example, the UE 115 may be allocated resources for the reference signal such that the image spectrum falls between the transmitted signal, where the mirror image signal falls on unoccupied or unused resource elements.

Figure 2:
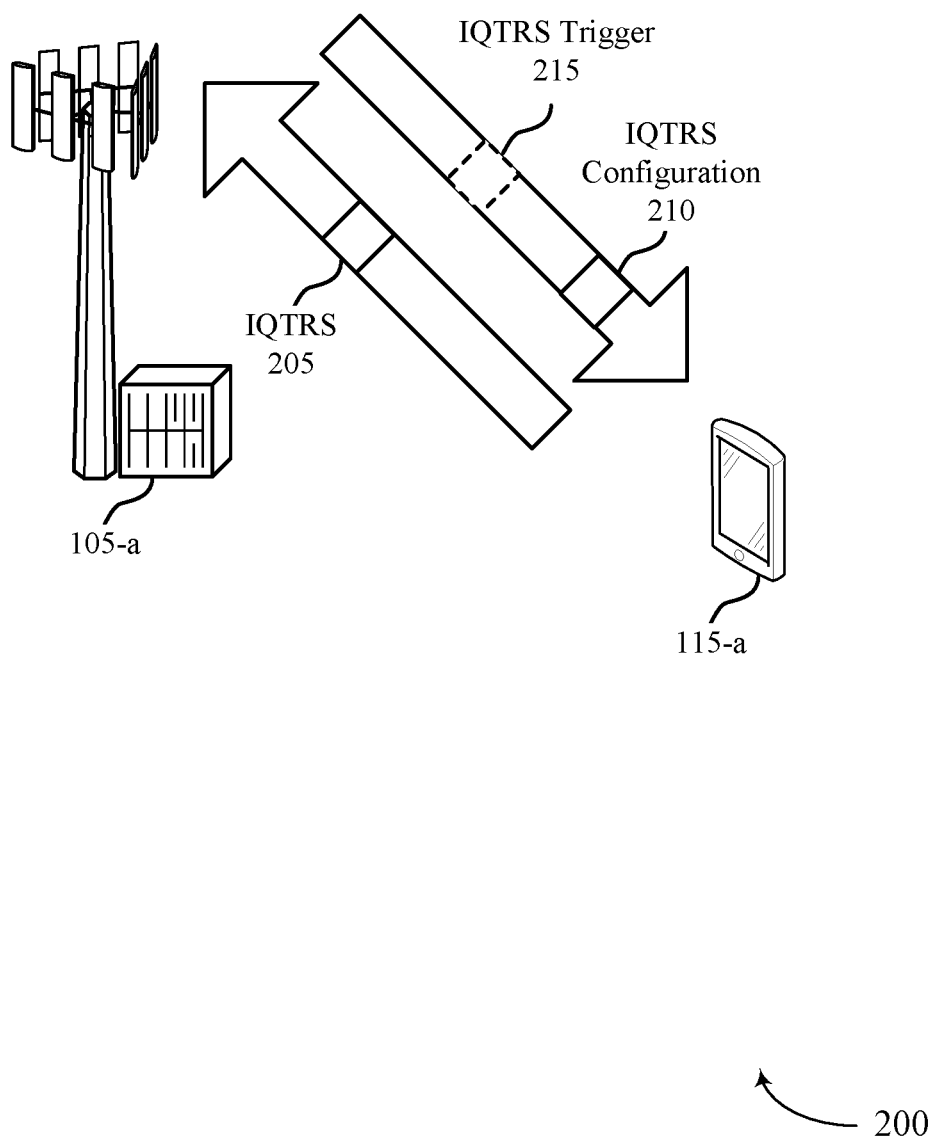
FIG. 2 illustrates an example of a wireless communications system that supports an in-phase and quadrature-phase tracking reference signal for an uplink shared channel in accordance with aspects of the present disclosure.

FIG. 2 illustrates an example of a wireless communications system 200 that supports an in-phase and quadrature-phase tracking reference signal for an uplink shared channel in accordance with aspects of the present disclosure. In some examples, the wireless communications system 200 may implement aspects of wireless communication system 100. The wireless communications system 200 may include UE 115-*a* and base station 105-*a*, which may be respective examples of a UE 115 and a base station 105 as described with reference to FIG. 1. The wireless communications system 200 may support OFDM communications between UEs 115 and base stations 105.

The wireless communications system 200 may experience some radio frequency impairments, such as in-phase and quadrature-phase (IQ) imbalances, based on analog characteristics of the devices in the wireless communications system 200. These impairments may be independent of channel conditions and other over-the-air factors, such that a communications link between a UE 115 and a base station 105 in ideal channel conditions may still experience impairments due to IQ imbalances. Distortion from the impairments may degrade performance and introduce a noise floor, which may limit the operational SNR at the receiver. These impairments may be more significant in systems with a high MCS, or systems with a high data rate, or QAM, or some combination of these, as these systems may have more stringent quality and reliability conditions.

IQ impairment may be introduced when a transmitting device upconverts or downconverts a baseband signal to a local oscillator frequency. When IQ paths, or branches, are not aligned or matched by phase and amplitude, a mirrored image signal occurs at the negative spectrum (e.g., the negative local oscillator frequency). In some cases, the upconverting may impact an error vector magnitude at the unconverted signal. The mirrored image signal may affect an MSE of a constellation point that the signal is supposed to map to, adding some distortion to the constellation point of the signal. The distortion may make it unclear which QAM constellation point the signal actually maps to. The constellation type may not affect the MSE caused by IQ impairments, so for higher order QAM constellations, the error from IQ impairment may become more significant as the constellation points become closer. Additional examples of error introduced by upconverting are described with reference to FIG. 3.

Some systems may perform a calibration procedure at the base station 105 per transmit chain when initiating communications with a UE 115 to compensate for IQ impairments. However, these systems do not provide compensation techniques when the UE 115 is connected to the base station 105, which may be useful such as if the local oscillator frequency changes or drifts while the UE 115 is connected. Additionally, in systems with a large number of transmit chains (e.g., massive MIMO systems), calibrating each transmit chain may be very time consuming and expensive for the base station 105.

Techniques described herein support a reference signal 205 to compensate for radio frequency impairments at wireless devices, such as IQ impairments. The reference signal 205, which may be an example of an IQTRS, may be transmitted to track IQ impairments while a UE 115 is online or connected to a base station 105, enabling the UE 115 to achieve higher constellations by reducing the noise floor introduce by radio frequency impairments such as IQ impairments. Additionally, the reference signal 205 may remove calibration operations at the base station 105. For example, the receiver may use the reference signal 205 to compensate for IQ impairments at the receiver. An IQTRS may be able to track IQ mismatches which are frequency selective or frequency dependent based on waveform characteristics.

In an example, base station 105-a may transmit a reference signal configuration 210 to UE 115-a. The reference signal configuration 210 may indicate a set of resources for tracking IQ imbalances. Due to IQ impairment properties, the set of resources may be sparse in the frequency domain and non-symmetrical around the local oscillator frequency of UE 115-a. Therefore, when UE 115-a upconverts the IQTRS to the local oscillator frequency, the mirror image signal will fall between the reference signal 205. The set of resources may be allocated such that base station 105-a can filter the received signal and achieve processing gain over the thermal noise. Base station 105-a may estimate the IQ impairments based on the waveform of the reference signal 205. This may enable base station 105-a to compensate for IQ impairments at UE 115-a without calibrating each transmit chain.

Compensation for radio frequency impairments may be made at the receiver or at the transmitter. For example, base station 105-a may receive the reference signal 205, determine the IQ impairments, and transmit a measurement report (e.g., and IQTRS report) to UE 115-a on a feedback channel. In some cases, the measurement report may be unique per-UE 115, as each UE 115 may have different IQ mismatches or imbalances. UE 115-a may apply transmission modifications or compensations based on the measurement report.

In some examples, base station 105-a may apply compensation as a receiver. For example, base station 105-a may compensate for the IQ imbalance of UE 115-a during decoding or a channel estimation process. In some example, base station 105-a may compensate for the IQ imbalances after a Fast Fourier Transform (FFT) operation. Additionally, or alternatively, base station 105-a may modify one or more antenna arrays at base station 105-a to compensate for the IQ impairment. In some cases, base station 105-a may modify phase and amplitude of received signaling in time domain processing.

In some cases, the reference signal 205 for IQ tracking and compensation may have unique signaling to configure the reference signal 205. For example, the reference signal configuration 210 may indicate a continuous allocation in specific places in the frequency domain, such that base station 105-a may filter the signal. The reference signal configuration 210 may then include fields or parameters for indicating the resource allocations.

In some cases, the reference signal 205 for IQ tracking and compensation may be based on other reference signals or configuration. For example, an IQTRS may be based on a demodulation reference signal (DMRS). Resources for a DMRS may be decimated (e.g., by two) in frequency. UE 115-a may transmit a waveform on the decimated resources, such that the mirrored image signal can be distinguished from the transmitted waveform and used by base station 105-a to compensate for IQ imbalances at UE 115-a. For example, UE 115-a may transmit the waveform on resource elements used for DMRS transmission.

In some cases, UE 115-a may be triggered to transmit the reference signal 205. In some example, base station 105-a may request for UE 115-a to transmit the reference signal 205 by transmitting a reference signal trigger 215 to UE 115-a. In some cases, the reference signal trigger 215 may be based on a request to transmit an uplink DMRS, and the reference signal trigger 215 may specify to adjust the uplink DMRS for IQ tracking. Additionally, or alternatively, UE 115-a may periodically transmit the reference signal 205. For example, once a timer expires at UE 115-a, UE 115-a may transmit the reference signal 205. In some cases, UE 115-a may transmit the reference signal 205 upon connection to a base station 105 or upon detecting a local oscillator drift.

In some cases, since IQ impairments are independent from noise variance, even in high SNR and multiple-antenna MIMO systems, IQ impairments may become a limiting factor to higher constellations, therefore, the receiver may combine antennas (e.g., and the signaling received on those antennas) prior to performing IQ estimation to achieve processing gain. For example, if base station 105-*a* is utilizing multiple antennas to communicate with UE 115-*a*, base station 105-*a* may combine the signaling received on the multiple antenna to estimate IQ impairments of UE 115-*a* (e.g., based on the reference signal 205).

IQ imbalance tracking for downlink may have some differences from IQ imbalance tracking for uplink, for example based on beamforming. In some cases, IQ imbalance tracking for downlink may be performed per-beam, as each beam may be a different combination of analog chains which may produce a different subset of IQ impairments (e.g., per-beam IQ impairments). In some systems, a UE 115 may not have beams, but a base station 105 may have receive beams. Therefore, the base station 105 in these systems may compensate for the UE 115 (e.g., on a per-device basis) based on a received IQTRS. The uplink IQTRS signal may be transmitted as a single or multiple-port DMRS as part of an uplink DMRS transmission. In some cases, a DMRS scheme may be used where a DMRS and an IQTRS are combined. In some examples, the UE 115 may be requested to transmit the combined DMRS and IQTRS.

Figure 3:
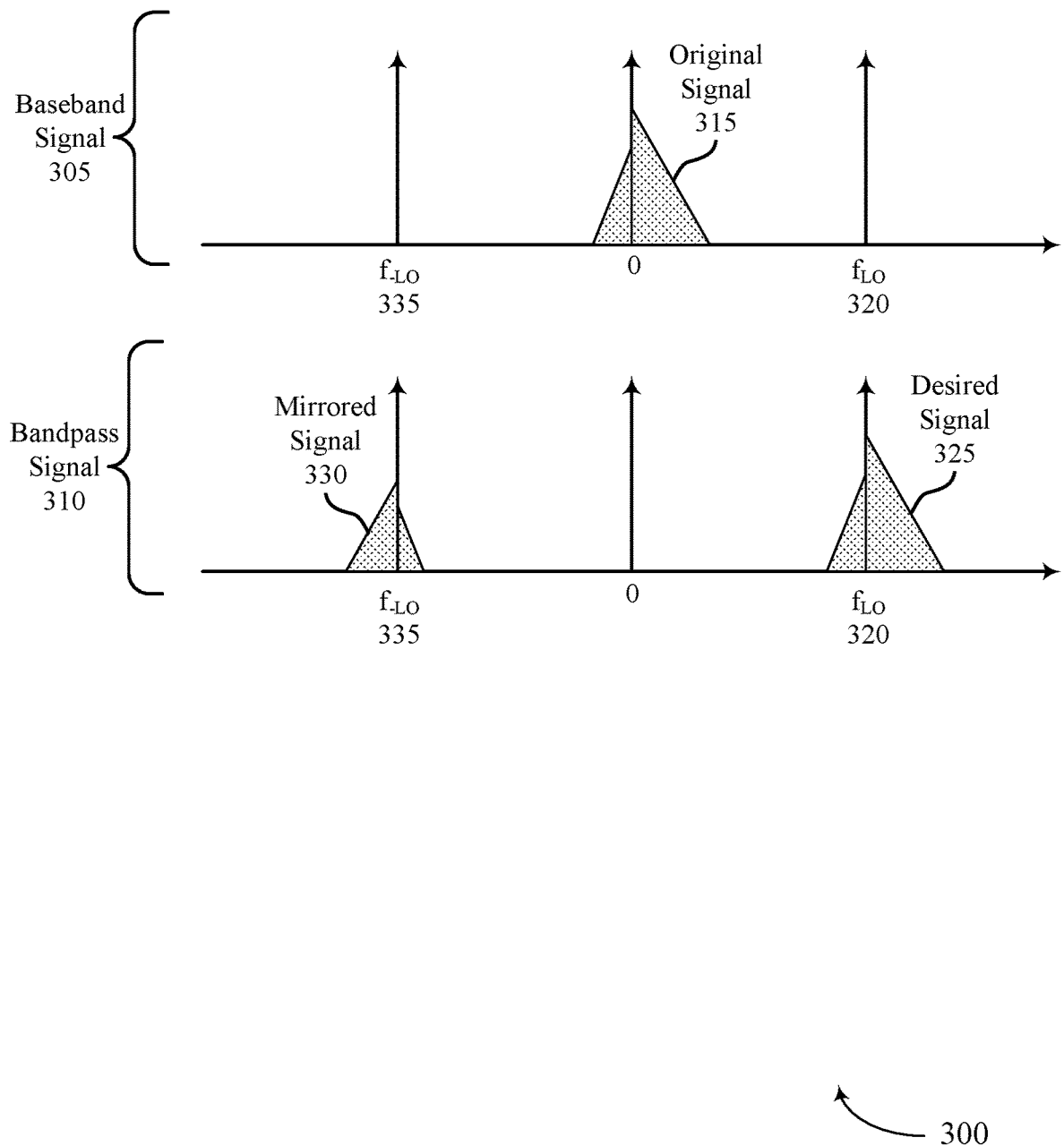
FIG. 3 illustrates an example of a signal upconversion that supports an in-phase and quadrature-phase tracking reference signal for an uplink shared channel in accordance with aspects of the present disclosure.

FIG. 3 illustrates an example of a signal upconversion 300 that supports an in-phase and quadrature-phase tracking reference signal for an uplink shared channel in accordance with aspects of the present disclosure. In some examples, the signal upconversion 300 may implement aspects of wireless communication system 100.

A transmitting device may upconvert an original signal 315 as described with reference to FIG. 2, upconverting a baseband signal 305 to a bandpass signal 310. An original signal 315 may be upconverted to a local oscillator frequency 320 to generate the bandpass signal 310. While this upconversion may create a desired signal 325, the upconversion may also result in a mirrored signal 330. The mirrored signal 330 may occur around the negative spectrum (e.g., at a negative local oscillator frequency 335). The upconversion may, in some cases, affect an error vector magnitude of the desired signal 325. The mirrored signal 330 and error vector magnitude may result in an IQ imbalance for the bandpass signal 310.

In some cases, an amplitude (e.g., $E_r$) and a phase of the IQ parts when upconverting or down-converting a signal may determine a condition of an IQ impairment. If the IQ branches are aligned (e.g., all branches aligned), there may not be any impairments. If there are some amplitude or phase differences, there may be some IQ impairments. The impairment caused by the mirrored signal 330 may affect how the transmitted signal maps to a constellation point of a QAM constellation. For example, the IQ branches during upconverting or down-converting may deviate the transmitted signal from the original constellation point on a QAM constellation. This may result in the transmitted signal being decoded wrong at the receiver, as the impairment may cause the signal to be closer to a different QAM constellation point than the intended QAM constellation point. In some cases, a decoder may implement a hard decision slicer, which provides uncoded bit error rate (BER) results that may differentiate whenever the receiver decodes the wrong constellation. To maintain a zero BER, the receiver may remain in the slicing zones of the hard decision slicer.

Because IQ impairments are based on radio frequency impairments of the device, an MSE caused by these impairments may be the same for different QAM constellations, such that the constellation type does not have an impact on the IQ impairment MSE. The MSE may be based on the phase and amplitude distortion of the IQ impairments. Therefore, higher QAM constellations with closer constellation points may be affected more by IQ impairment. For example, 64QAM may have the same MSE as 1024QAM. Some systems may support very high order QAM constellations, such as 16K QAM, so devices using these higher order constellations may maintain a minimum MSE to communicate without significant loss.

To maintain a minimum MSE, wireless devices described herein may support techniques for a reference signal to track radio frequency impairments. For example, a UE 115 may transmit a reference signal using a waveform such that the receiving device (e.g., a base station 105) can compensate for the mirrored signal and corresponding impairments of the bandpass signal.

Figure 4:
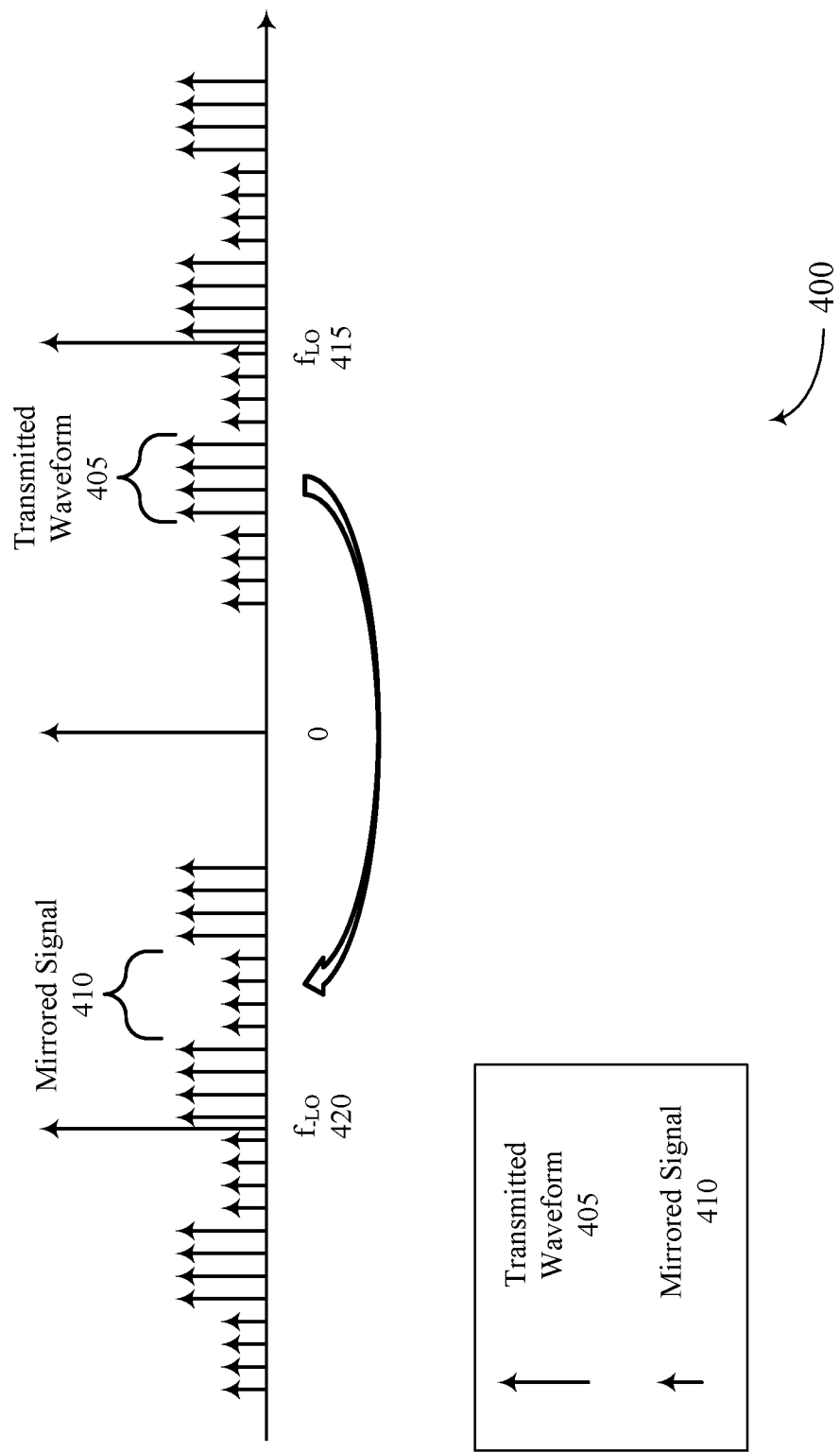
FIG. 4 illustrates an example of a reference signal waveform that supports an in-phase and quadrature-phase tracking reference signal for an uplink shared channel in accordance with aspects of the present disclosure.

FIG. 4 illustrates an example of a reference signal waveform 400 that supports an in-phase and quadrature-phase tracking reference signal for an uplink shared channel in accordance with aspects of the present disclosure. In some examples, the reference signal waveform 400 may implement aspects of wireless communication system 100.

The reference signal waveform 400 may be an example of a reference signal described herein that has been upconverted to a bandpass signal. The reference signal waveform 400 may include a transmitted waveform 405 and a mirrored signal 410, which may be created due to upconverting the transmitted waveform 405 to a local oscillator frequency 415. The transmitted waveform 405 may be transmitted around the local oscillator frequency 415. The receiver (e.g., a base station 105) may be configured with and able to determine the local oscillator frequency of the transmitter to identify the transmitted waveform 405 and the mirrored signal 410.

Resources for the transmitted waveform 405 may be sparse in the frequency domain and non-symmetrical around the local oscillator frequency 415. Therefore, the mirrored signal 410 may fall around the transmitted waveform 405 from the negative local oscillator frequency 420. For example, the mirrored signal 410 and the transmitted waveform 405 may not overlap in the frequency domain, and the base station 105 may be able to identify the transmitted waveform 405 and the mirrored signal 410 individually. The mirrored signal 410 may be weaker (e.g., have less power, as shown by shorter arrows) than the transmitted waveform 405. In some cases, allocating the frequency resources for the transmitted waveform 405 such that the mirrored signal 410 does not overlap may assist the receiver in filtering the signal and achieving processing gain over thermal noise. In some cases, each arrow of the transmitted waveform 405 may correspond to a resource element in the frequency domain of a resource grid.

In some examples, each cluster of the transmitted waveform 405 in the frequency domain may have an even number of resource elements. The clusters may occur on odd frequencies around the local oscillator frequency 415 such that the mirror image falls on unoccupied resource elements.

Figure 5:
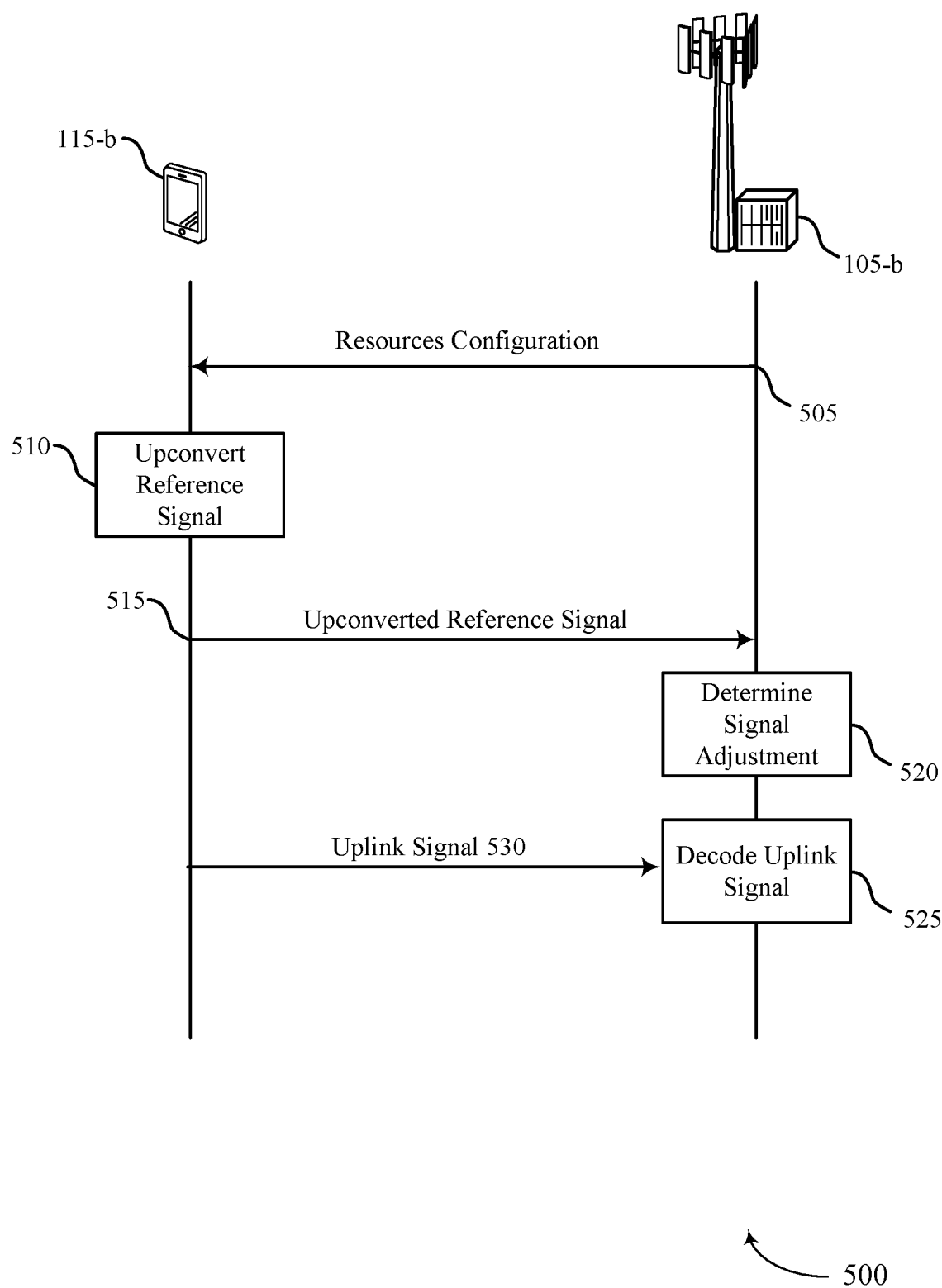
FIG. 5 illustrates an example of a process flow that supports an in-phase and quadrature-phase tracking reference signal for an uplink shared channel in accordance with aspects of the present disclosure.

FIG. 5 illustrates an example of a process flow 500 that supports an in-phase and quadrature-phase tracking reference signal for an uplink shared channel in accordance with aspects of the present disclosure. In some examples, the process flow 500 may implement aspects of wireless communication system 100. The process flow 500 includes UE 115-*b* and base station 105-*b*, which may be respective examples of a UE 115 and a base station 105 as described herein.

At 505, base station 105-*b* may transmit, to UE 115-*b*, a configuration indicating a set of resources for a reference signal for tracking an in-phase and quadrature-phase imbalance. The set of resources may include a first subset of resources for transmitting the reference signal and a second subset of resources for a mirror image signal that is generated during upconversion of the reference signal at UE 115-b. In some cases, the first subset of resources may be interleaved with the second subset of resources. For example, the first subset of resources and the second subset of resources may not share any specific resource element. In some cases, the first subset of resources around a local oscillator frequency of UE 115-b. In some cases, the first subset of resources and the second subset of resources may be mirrored around the local oscillator frequency of UE 115-b.

At 510, UE 115-b may upconvert the reference signal to a set of subcarriers corresponding to the first subset of resources. Upconverting the reference signal may create a mirrored image signal on another set of subcarriers corresponding to the second subset of resources.

At 515, UE 115-b may transmit the upconverted reference signal on the first subset of resources. The transmitted waveform may include the upconverted reference signal on subcarriers corresponding to the first subset of resources and the mirrored image signal on subcarriers corresponding to the second subset of resources.

Base station 105-b may receive the reference signal on the first subset of resources and the mirror image signal on the second subset of resources. At 520, base station 105-b may determine a signal adjustment for communications with UE 115-b based on the received reference signal and the received mirror image signal. In some cases, base station 105-b may adjust an antenna array of the base station or a phase and amplitude processing in the time domain, or both, based on the signal adjustment to compensate for the in-phase and quadrature-phase imbalance.

At 525, base station 105-b may decode an uplink signal 530 from UE 115-b according to the determined signal adjustment. For example, base station 105-b may compensate for IQ imbalances caused by hardware or radio frequency processing at UE 115-b. In some examples, base station 105-b may transmit a measurement report for the IQ imbalance in response to receiving the reference signal and the mirror image signal. UE 115-b may then apply some compensation for the IQ imbalance when transmitting to base station 105-b.

In some examples, UE 115-b may be triggered to transmit the upconverted reference signal. For example, base station 105-b may transmit a request for UE 115-b to transmit the reference signal reporting the in-phase and quadrature-phase imbalance. In some cases, UE 115-b may detect a periodic trigger to transmit the reference signal to track the in-phase and quadrature-phase imbalance. For example, UE 115-b may transmit the upconverted reference signal every 100 ms.

Figure 6:
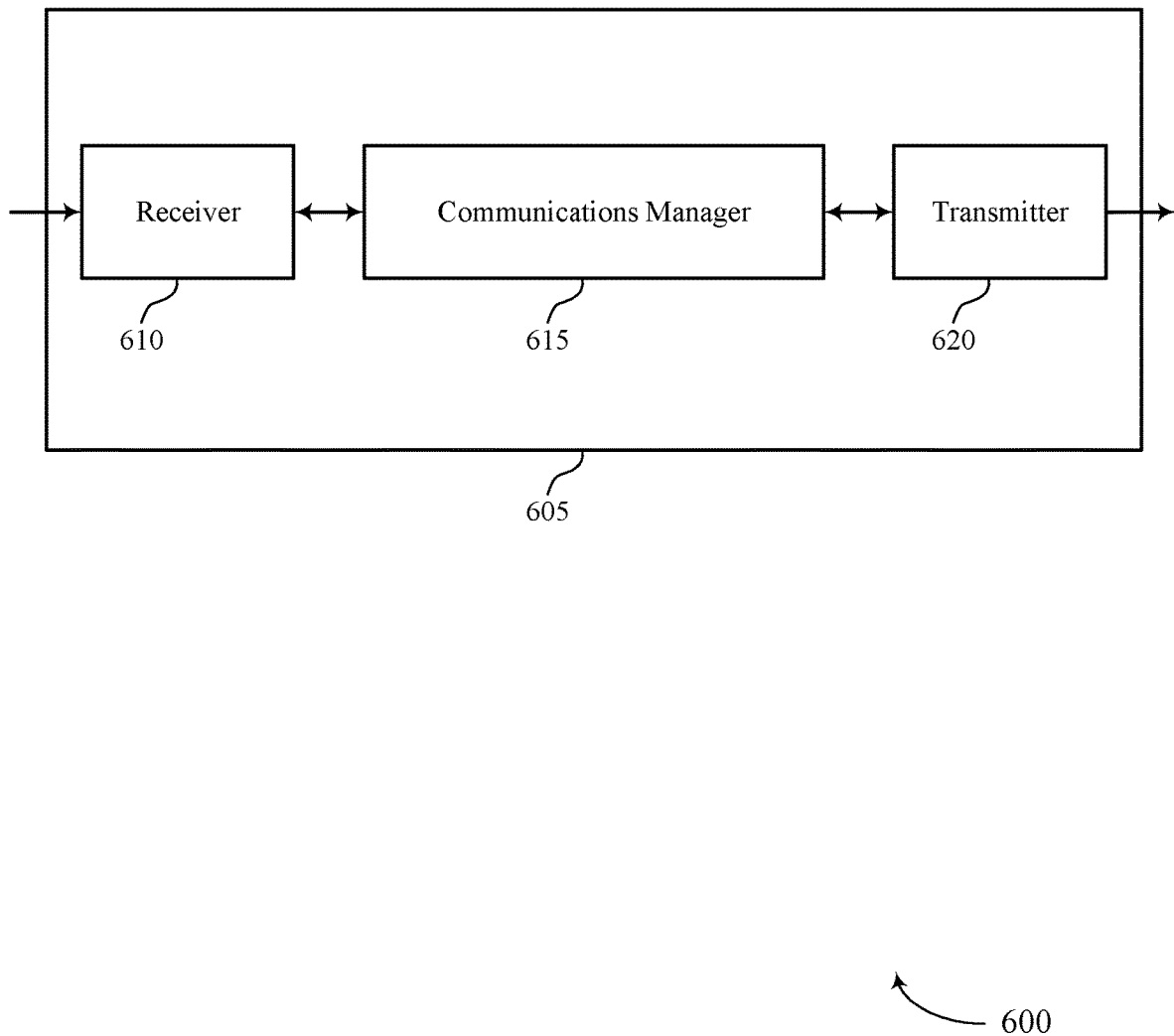
FIGS. 6 and 7 show block diagrams of devices that support an in-phase and quadrature-phase tracking reference signal for an uplink shared channel in accordance with aspects of the present disclosure.

FIG. 6 shows a block diagram 600 of a device 605 that supports an in-phase and quadrature-phase tracking reference signal for an uplink shared channel in accordance with aspects of the present disclosure. The device 605 may be an example of aspects of a UE 115 as described herein. The device 605 may include a receiver 610, a communications manager 615, and a transmitter 620. The device 605 may also include one or more processors, memory coupled with the one or more processors, and instructions stored in the memory that are executable by the one or more processors to enable the one or more processors to support the IQ tracking reference signal features discussed herein. Each of these components may be in communication with one another (e.g., via one or more buses).

The receiver 610 may receive information such as packets, user data, or control information associated with various information channels (e.g., control channels, data channels, and information related to an in-phase and quadrature-phase tracking reference signal for an uplink shared channel, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal, upconvert the reference signal to a set of subcarriers corresponding to the first subset of resources, and transmit the upconverted reference signal on the first subset of resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
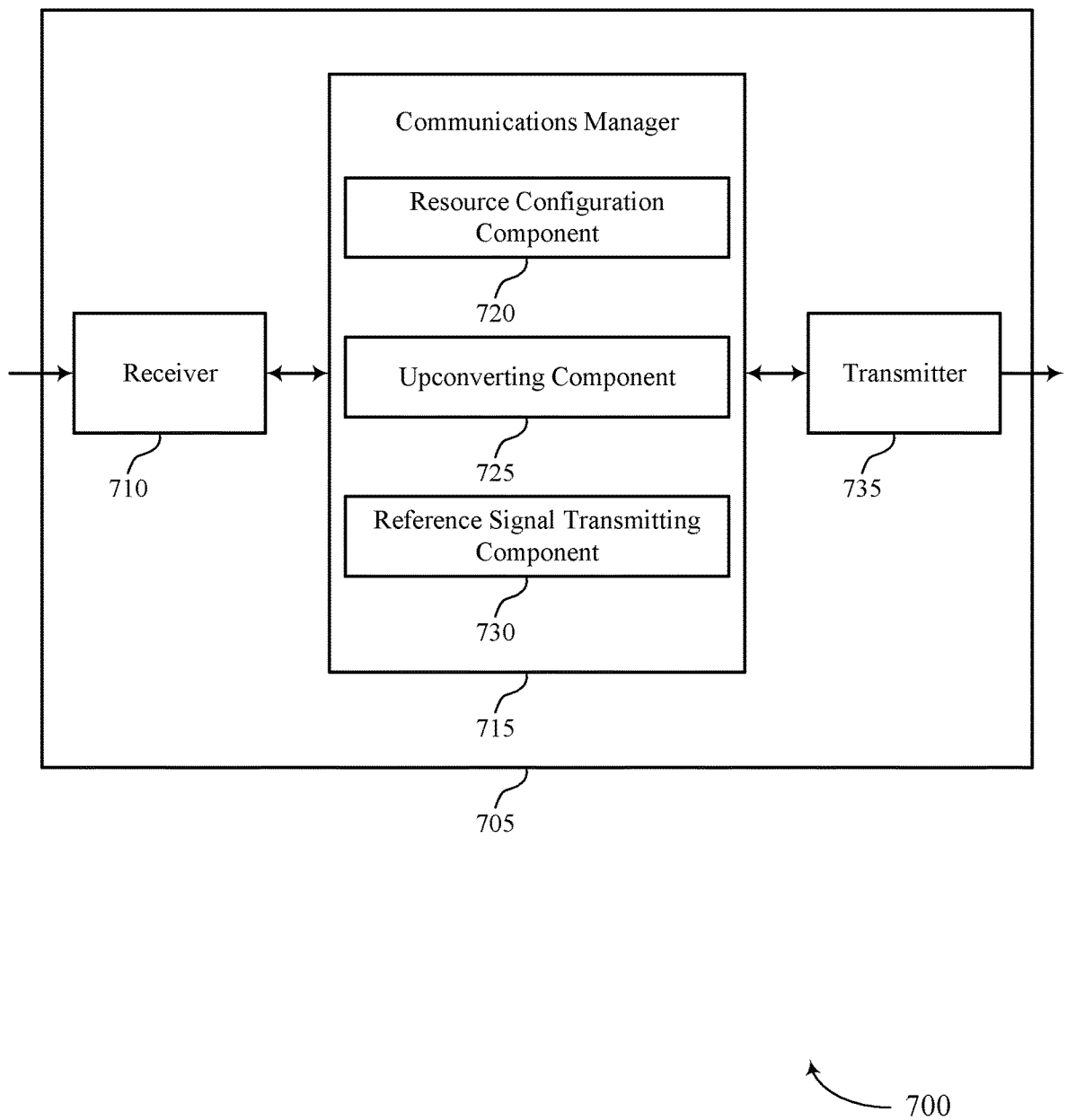

FIG. 7 shows a block diagram 700 of a device 705 that supports an in-phase and quadrature-phase tracking reference signal for an uplink shared channel in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to an in-phase and quadrature-phase tracking reference signal for an uplink shared channel, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a resource configuration component 720, an upconverting component 725, and a reference signal transmitting component 730. The communications manager 715 may be an example of aspects of the communications manager 910 described herein.

The resource configuration component 720 may receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal. The upconverting component 725 may upconvert the reference signal to a set of subcarriers corresponding to the first subset of resources. The reference signal transmitting component 730 may transmit the unconverted reference signal on the first subset of resources.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

In some cases, the resource configuration component 720, the upconverting component 725, and the reference signal transmitting component 730 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the resource configuration component 720, the upconverting component 725, and the reference signal transmitting component 730 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
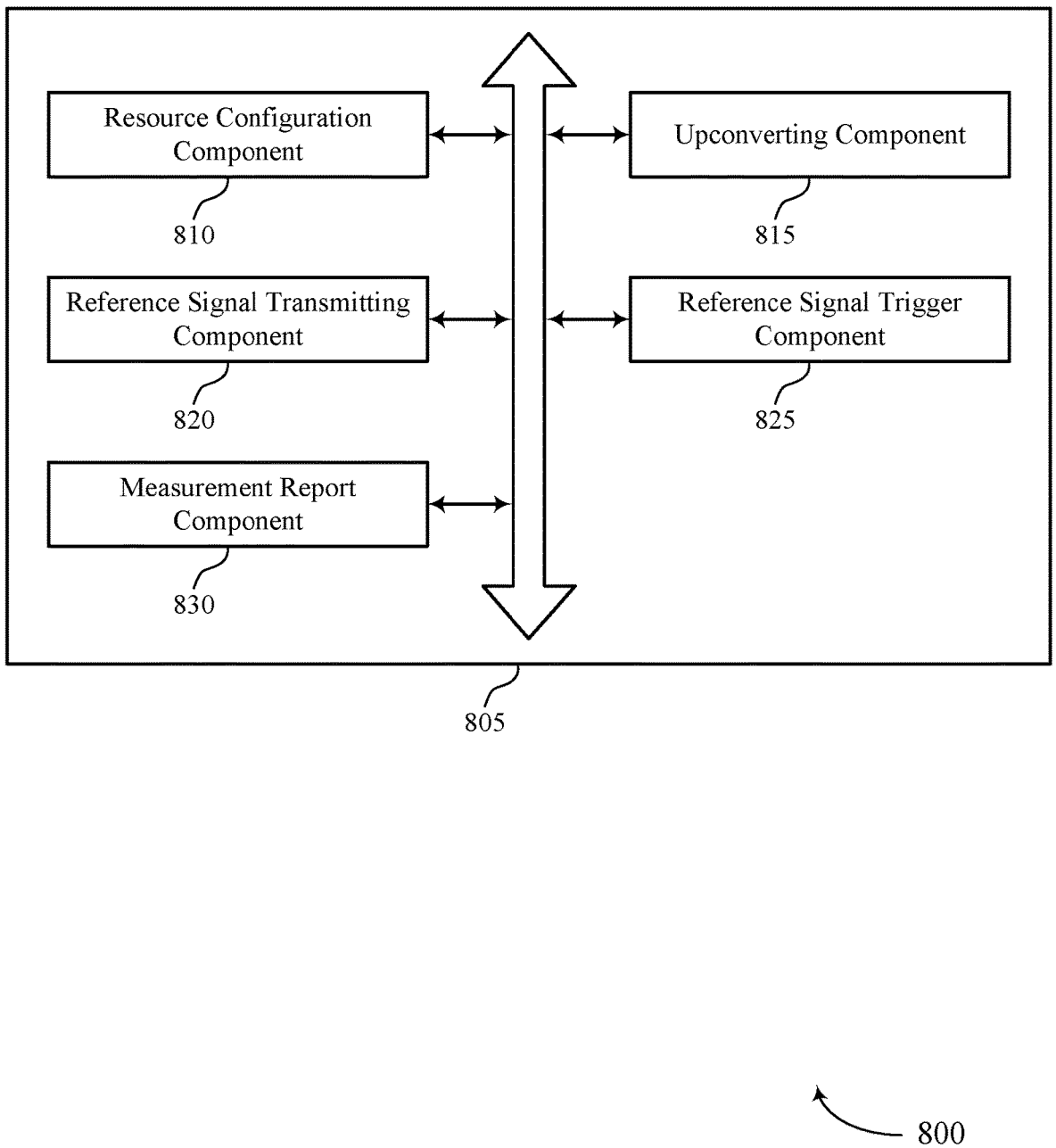
FIG. 8 shows a block diagram of a communications manager that supports an in-phase and quadrature-phase tracking reference signal for an uplink shared channel in accordance with aspects of the present disclosure.

FIG. 8 shows a block diagram 800 of a communications manager 805 that supports an in-phase and quadrature-phase tracking reference signal for an uplink shared channel in accordance with aspects of the present disclosure. The communications manager 805 may be an example of aspects of a communications manager 615, a communications manager 715, or a communications manager 910 described herein. The communications manager 805 may include a resource configuration component 810, an upconverting component 815, a reference signal transmitting component 820, a reference signal trigger component 825, and a measurement report component 830. Each of these modules may communicate, directly or indirectly, with one another (e.g., via one or more buses).

The resource configuration component 810 may receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal. In some cases, the received configuration indicates a continuous allocation of frequency resources for the reference signal in the first subset of the set of resources, and a lack of frequency resources for the reference signal in the second subset of the set of resources.

In some cases, the set of resources includes resources for a demodulation reference signal, where the first subset of the set of resources includes a first portion of demodulation reference signal resources in an uplink channel and the second subset of the set of resources includes a second portion of the demodulation reference signal resources in the uplink channel. In some cases, the first subset of the set of resources is centered around an odd frequency offset. In some cases, the first subset of resources are interleaved with the second subset of resources. In some cases, the reference signal is asymmetrical around a local oscillator frequency of the UE. In some cases, the upconverted reference signal is transmitted on the first subset of resources using a set of antenna ports.

The upconverting component 815 may upconvert the reference signal to a set of subcarriers corresponding to the first subset of resources. The reference signal transmitting component 820 may transmit the upconverted reference signal on the first subset of resources.

The reference signal trigger component 825 may receive a request from the base station to transmit the reference signal to track the in-phase and quadrature-phase imbalance, the upconverted reference signal transmitted based on receiving the request. In some examples, the reference signal trigger component 825 may detect a periodic trigger to transmit the reference signal to track the in-phase and quadrature-phase imbalance, the upconverted reference signal transmitted based on detecting the periodic trigger. In some cases, the received request configures the UE to transmit the reference signal based on an uplink demodulation reference signal configuration.

The measurement report component 830 may receive, from the base station, a measurement report for the reference signal in response to transmitting the upconverted reference signal. In some examples, the measurement report component 830 may adjust an antenna array of the UE or modifying a phase and amplitude in time domain processing, or both, based on the measurement report to compensate for the in-phase and quadrature-phase imbalance.

In some cases, the resource configuration component 810, the upconverting component 815, the reference signal transmitting component 820, a reference signal trigger component 825, and the measurement report component 830 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the resource configuration component 810, the upconverting component 815, the reference signal transmitting component 820, a reference signal trigger component 825, and the measurement report component 830 discussed herein.

Figure 9:
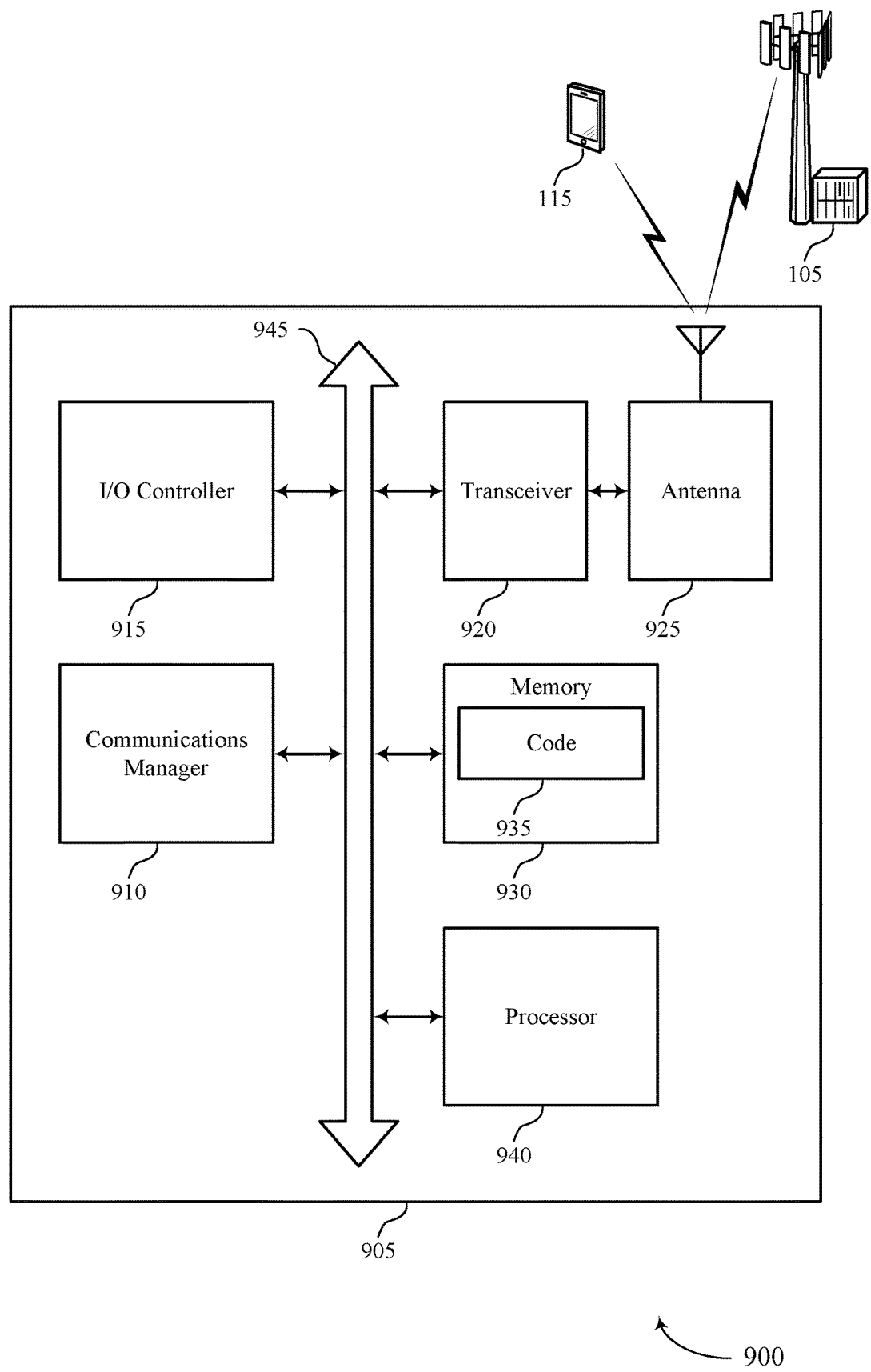
FIG. 9 shows a diagram of a system including a device that supports an in-phase and quadrature-phase tracking reference signal for an uplink shared channel in accordance with aspects of the present disclosure.

FIG. 9 shows a diagram of a system 900 including a device 905 that supports an in-phase and quadrature-phase tracking reference signal for an uplink shared channel in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal, upconvert the reference signal to a set of subcarriers corresponding to the first subset of resources, and transmit the upconverted reference signal on the first subset of resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting an in-phase and quadrature-phase tracking reference signal for an uplink shared channel).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
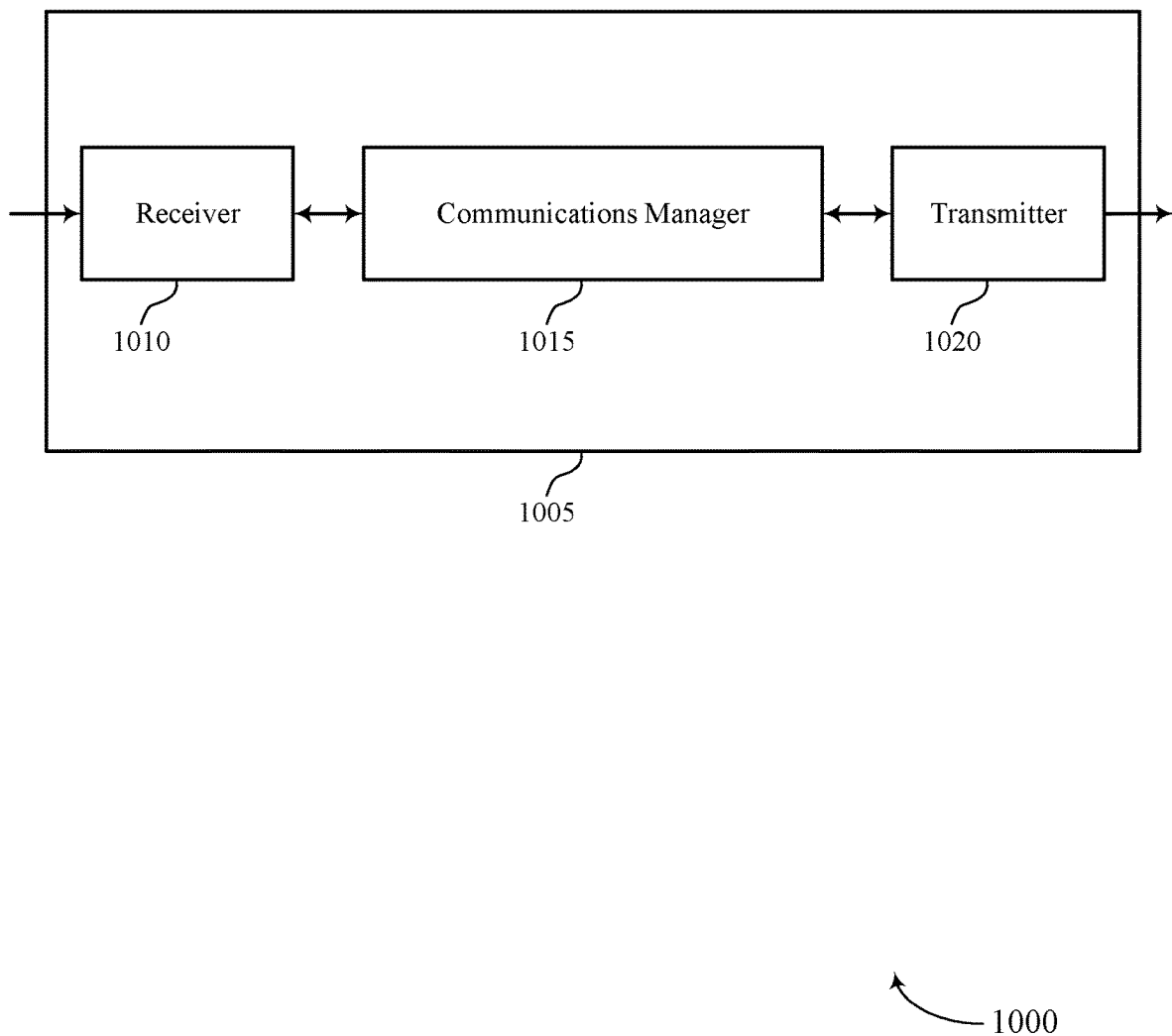
FIGS. 10 and 11 show block diagrams of devices that an support an in-phase and quadrature-phase tracking reference signal for an uplink shared channel in accordance with aspects of the present disclosure.

FIG. 10 shows a block diagram 1000 of a device 1005 that supports an in-phase and quadrature-phase tracking reference signal for an uplink shared channel in accordance with aspects of the present disclosure. The device 1005 may be an example of aspects of a base station 105 as described herein. The device 1005 may include a receiver 1010, a communications manager 1015, and a transmitter 1020. The device 1005 may also include one or more processors, memory coupled with the one or more processors, and instructions stored in the memory that are executable by the one or more processors to enable the one or more processors to perform the IQ tracking reference signal features discussed herein. Each of these components may be in communication with one another (e.g., via one or more buses).

The receiver 1010 may receive information such as packets, user data, or control information associated with various information channels (e.g., control channels, data channels, and information related to an in-phase and quadrature-phase tracking reference signal for an uplink shared channel, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE, receive the reference signal on the first subset of resources and the mirror image signal on the second subset of resources, determine a signal adjustment for communications with the UE based on the received reference signal and the received mirror image signal, and decode an uplink signal from the UE according to the determined signal adjustment. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
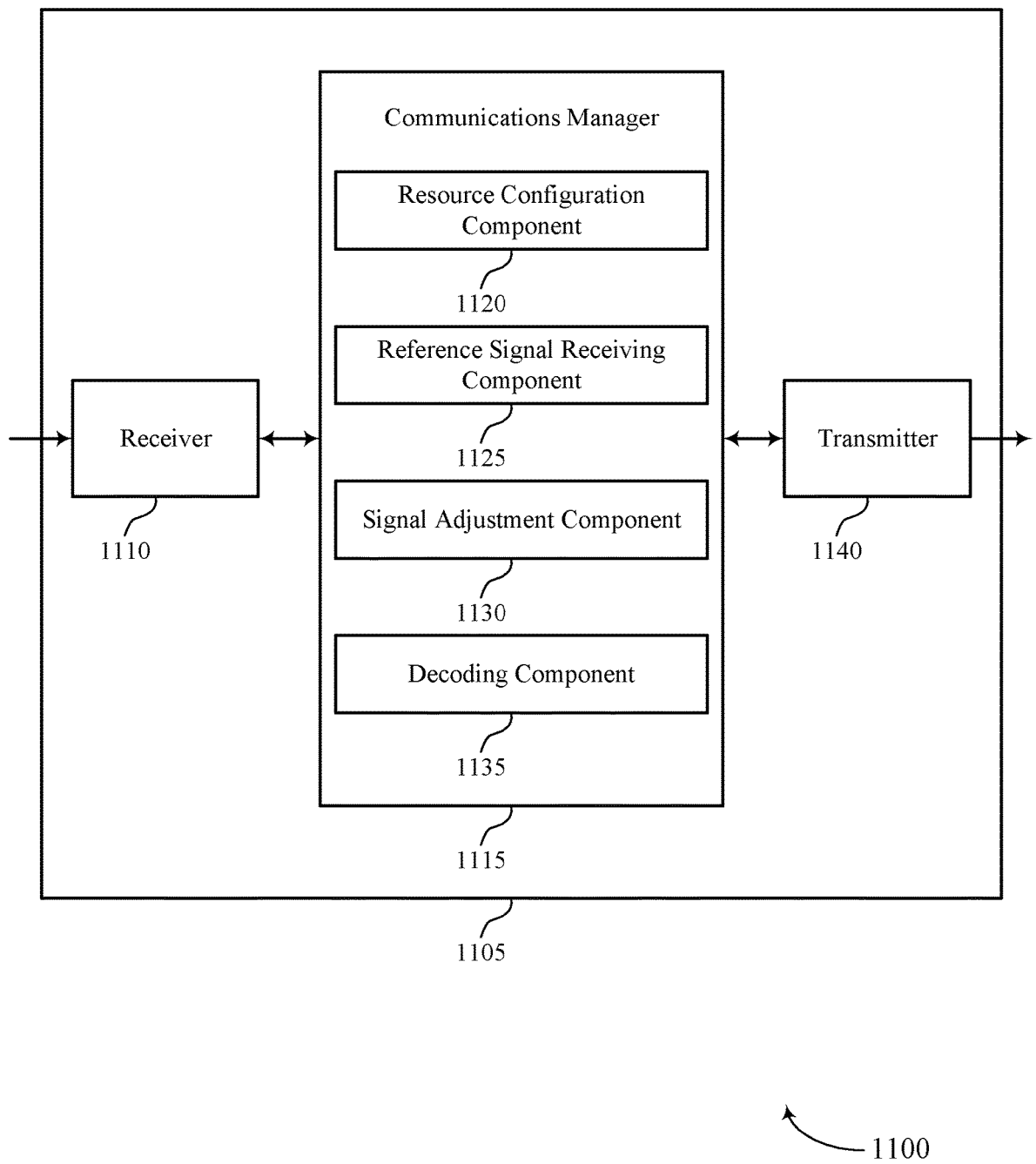

FIG. 11 shows a block diagram 1100 of a device 1105 that supports an in-phase and quadrature-phase tracking reference signal for an uplink shared channel in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to an in-phase and quadrature-phase tracking reference signal for an uplink shared channel, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a resource configuration component 1120, a reference signal receiving component 1125, a signal adjustment component 1130, and a decoding component 1135. The communications manager 1115 may be an example of aspects of the communications manager 1310 described herein.

The resource configuration component 1120 may transmit, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE.

The reference signal receiving component 1125 may receive the reference signal on the first subset of resources and the mirror image signal on the second subset of resources. The signal adjustment component 1130 may determine a signal adjustment for communications with the UE based on the received reference signal and the received mirror image signal. The decoding component 1135 may decode an uplink signal from the UE according to the determined signal adjustment.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

In some cases, the resource configuration component 1120, the reference signal receiving component 1125, the signal adjustment component 1130, and the decoding component 1135 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the resource configuration component 1120, the reference signal receiving component 1125, the signal adjustment component 1130, and the decoding component 1135 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 12:
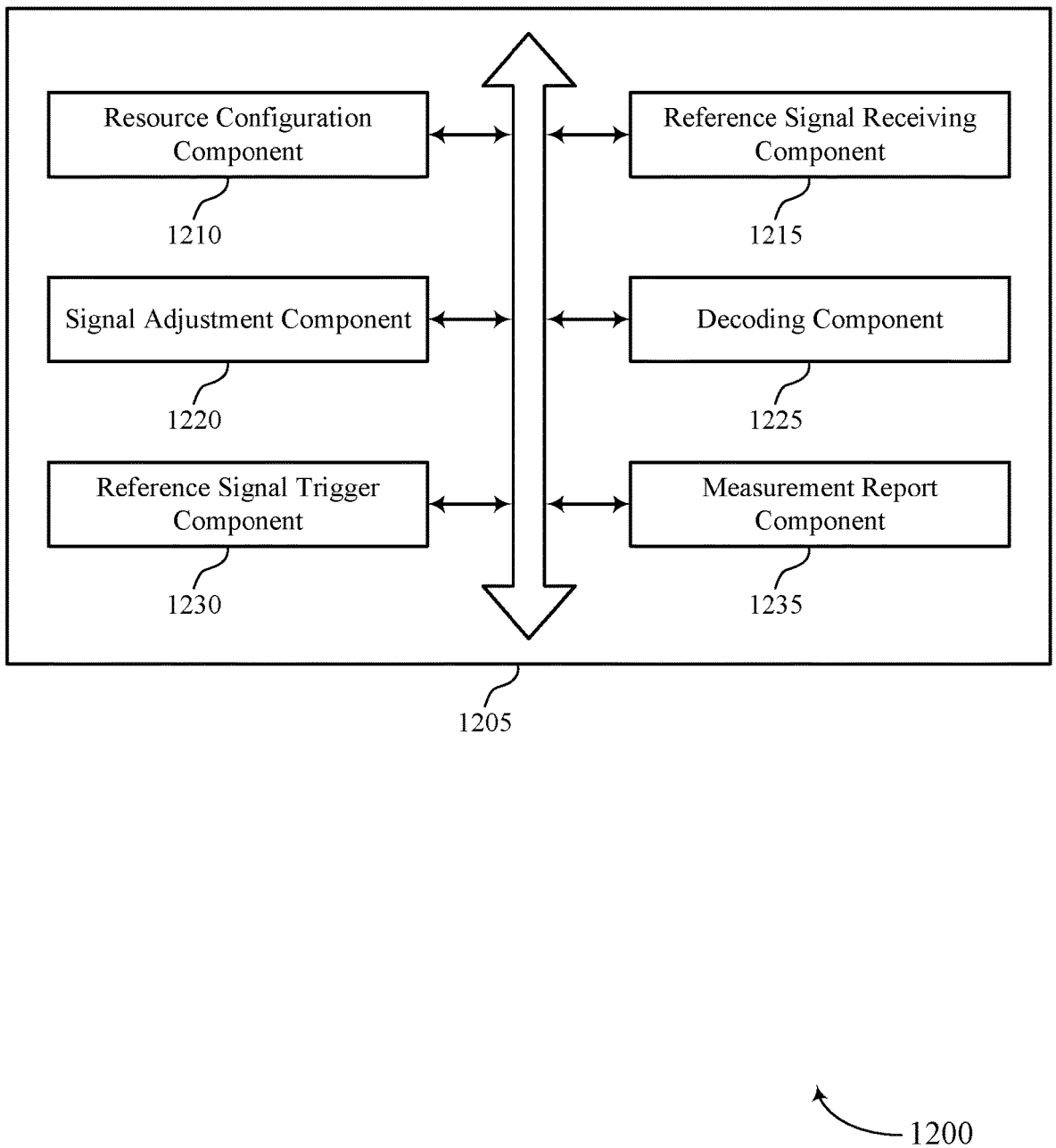
FIG. 12 shows a block diagram of a communications manager that supports an in-phase and quadrature-phase tracking reference signal for an uplink shared channel in accordance with aspects of the present disclosure.

FIG. 12 shows a block diagram 1200 of a communications manager 1205 that supports an in-phase and quadrature-phase tracking reference signal for an uplink shared channel in accordance with aspects of the present disclosure. The communications manager 1205 may be an example of aspects of a communications manager 1015, a communications manager 1115, or a communications manager 1310 described herein. The communications manager 1205 may include a resource configuration component 1210, a reference signal receiving component 1215, a signal adjustment component 1220, a decoding component 1225, a reference signal trigger component 1230, and a measurement report component 1235. Each of these modules may communicate, directly or indirectly, with one another (e.g., via one or more buses).

The resource configuration component 1210 may transmit, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE. In some cases, the transmitted configuration indicates a continuous allocation of frequency resources for the reference signal in the first subset of the set of resources, and a lack of any frequency resources for the reference signal in the second subset of the set of resources. In some cases, the set of resources includes resources for a demodulation reference signal, where the first subset of the set of resources includes a first portion of demodulation reference signal resources in an uplink channel and the second subset of the set of resources includes a second portion of the demodulation reference signal resources in the uplink channel.

In some cases, the first subset of the set of resources is centered around an odd frequency offset. In some cases, the first subset of resources are interleaved with the second subset of resources. In some cases, the reference signal is asymmetrical around a local oscillator frequency of the UE.

The reference signal receiving component 1215 may receive the reference signal on the first subset of resources and the mirror image signal on the second subset of resources. The signal adjustment component 1220 may determine a signal adjustment for communications with the UE based on the received reference signal and the received mirror image signal.

In some examples, the signal adjustment component 1220 may adjust an antenna array of the base station or a phase and amplitude processing in the time domain, or both, based on the signal adjustment to compensate for the in-phase and quadrature-phase imbalance. In some examples, the signal adjustment component 1220 may perform a channel estimation based on the received mirror image signal, where the signal adjustment is based on the channel estimation. In some examples, the signal adjustment component 1220 may apply the signal adjustment after a Fast Fourier Transform and prior to channel estimation.

In some examples, the signal adjustment component 1220 may combine signals received at antennas of the base station associated with the UE prior to performing the channel estimation. In some cases, the signals are combined based on a signal to noise ratio (SNR) of the signals.

The decoding component 1225 may decode an uplink signal from the UE according to the determined signal adjustment. The reference signal trigger component 1230 may transmit a request to the UE to transmit the reference signal to track the in-phase quadrature-phase imbalance, where the reference signal and the mirror image signal are received based on transmitting the request. In some examples, the reference signal trigger component 1230 may transmit, to the UE, an indication of a periodic trigger for the UE to use to transmit the reference signal to track the in-phase and quadrature-phase imbalance, where the reference signal and the mirror image signal are received based on the periodic trigger. In some cases, the transmitted request configures the UE to transmit the reference signal based on an uplink demodulation reference signal configuration. The measurement report component 1235 may transmit a measurement report for the reference signal in response to receiving the reference signal and the mirror image signal.

In some cases, the resource configuration component 1210, the reference signal receiving component 1215, the signal adjustment component 1220, the decoding component 1225, the reference signal trigger component 1230, and the measurement report component 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the resource configuration component 1210, the reference signal receiving component 1215, the signal adjustment component 1220, the decoding component 1225, the reference signal trigger component 1230, and the measurement report component 1235 discussed herein.

Figure 13:
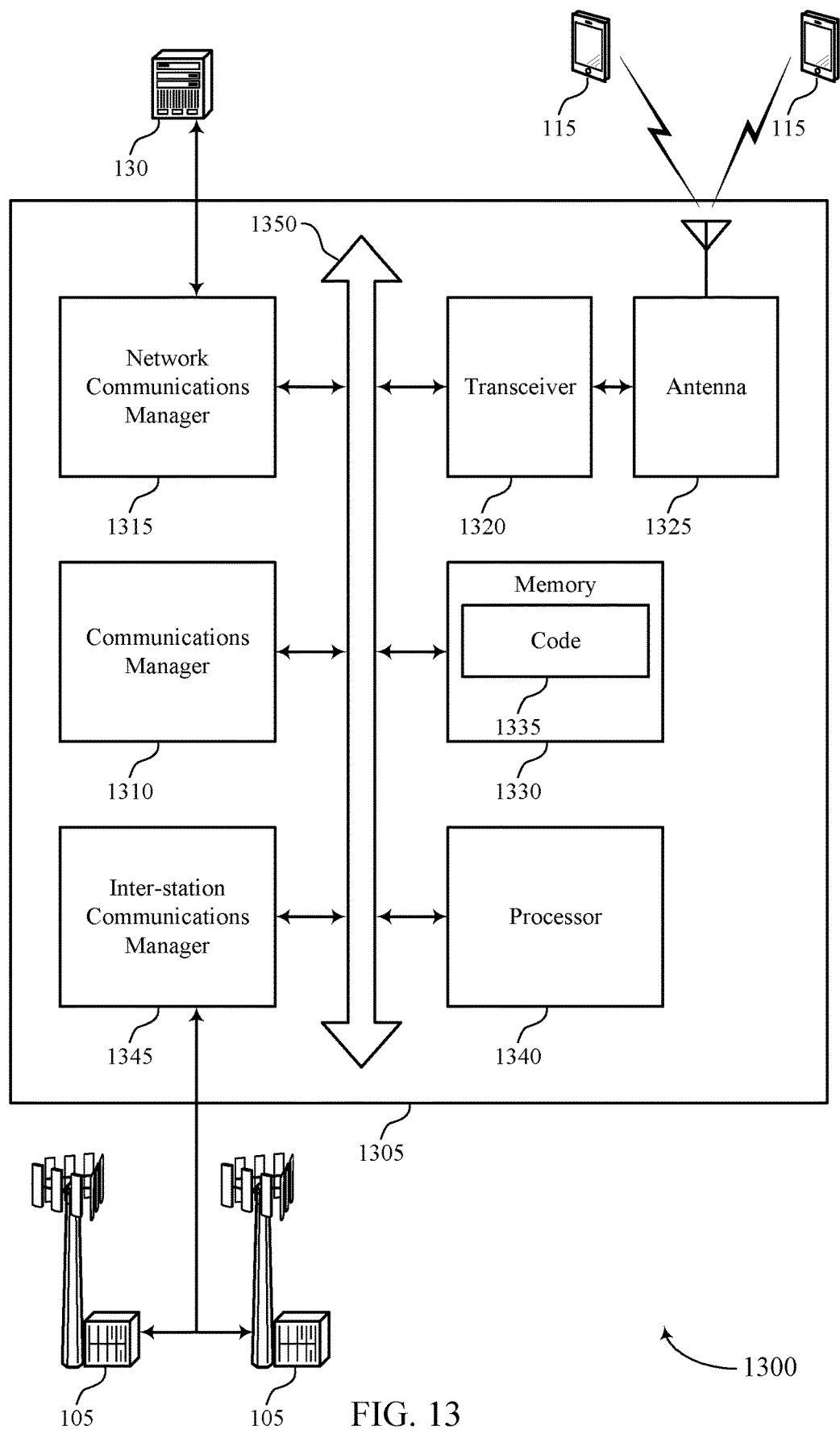
FIG. 13 shows a diagram of a system including a device that supports an in-phase and quadrature-phase tracking reference signal for an uplink shared channel in accordance with aspects of the present disclosure.

FIG. 13 shows a diagram of a system 1300 including a device 1305 that supports an in-phase and quadrature-phase tracking reference signal for an uplink shared channel in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE, receive the reference signal on the first subset of resources and the mirror image signal on the second subset of resources, determine a signal adjustment for communications with the UE based on the received reference signal and the received mirror image signal, and decode an uplink signal from the UE according to the determined signal adjustment.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting an in-phase and quadrature-phase tracking reference signal for an uplink shared channel).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
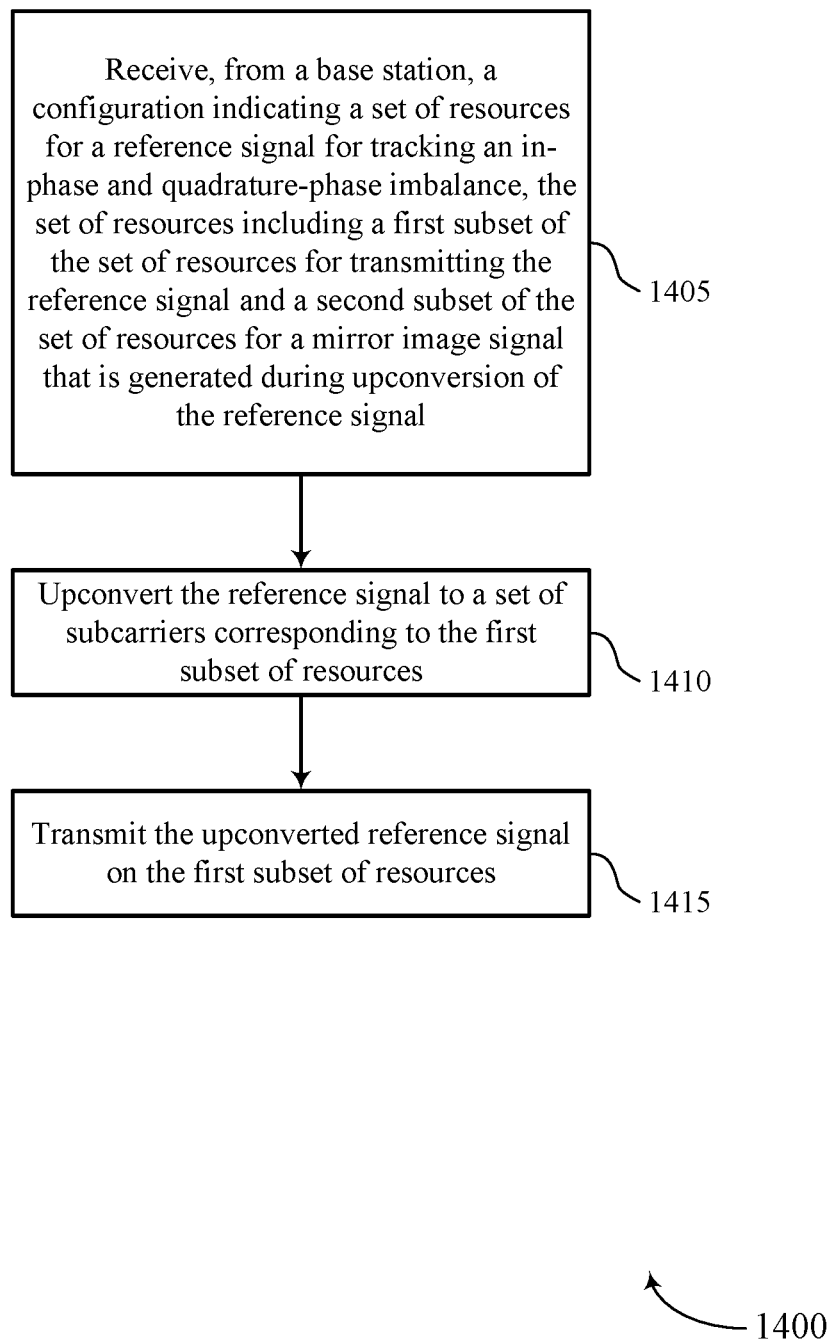
FIGS. 14 through 18 show flowcharts illustrating methods that support an in-phase and quadrature-phase tracking reference signal for an uplink shared channel in accordance with aspects of the present disclosure.

FIG. 14 shows a flowchart illustrating a method 1400 that supports an in-phase and quadrature-phase tracking reference signal for an uplink shared channel in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal. The operations of 1405 may be performed according to the methods described herein. In some examples, aspects of the operations of 1405 may be performed by a resource configuration component as described with reference to FIGS. 6 through 9.

At 1410, the UE may upconvert the reference signal to a set of subcarriers corresponding to the first subset of resources. The operations of 1410 may be performed according to the methods described herein. In some examples, aspects of the operations of 1410 may be performed by an upconverting component as described with reference to FIGS. 6 through 9.

At 1415, the UE may transmit the upconverted reference signal on the first subset of resources. The operations of 1415 may be performed according to the methods described herein. In some examples, aspects of the operations of 1415 may be performed by a reference signal transmitting component as described with reference to FIGS. 6 through 9.

Figure 15:
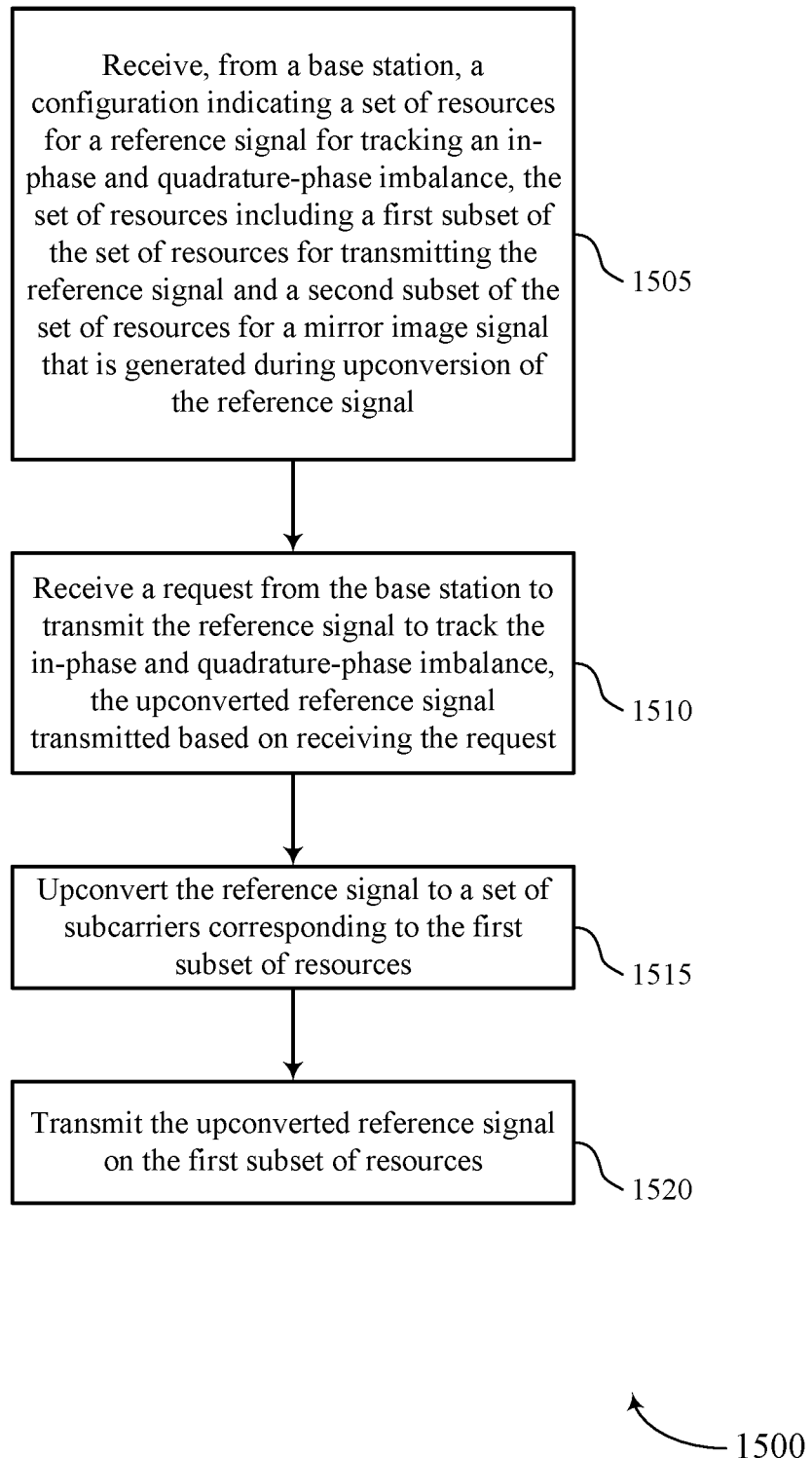

FIG. 15 shows a flowchart illustrating a method 1500 that supports an in-phase and quadrature-phase tracking reference signal for an uplink shared channel in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal. The operations of 1505 may be performed according to the methods described herein. In some examples, aspects of the operations of 1505 may be performed by a resource configuration component as described with reference to FIGS. 6 through 9.

At 1510, the UE may receive a request from the base station to transmit the reference signal to track the in-phase and quadrature-phase imbalance, the upconverted reference signal transmitted based on receiving the request. The operations of 1510 may be performed according to the methods described herein. In some examples, aspects of the operations of 1510 may be performed by a reference signal trigger component as described with reference to FIGS. 6 through 9.

At 1515, the UE may upconvert the reference signal to a set of subcarriers corresponding to the first subset of resources. The operations of 1515 may be performed according to the methods described herein. In some examples, aspects of the operations of 1515 may be performed by an upconverting component as described with reference to FIGS. 6 through 9.

At 1520, the UE may transmit the upconverted reference signal on the first subset of resources. The operations of 1520 may be performed according to the methods described herein. In some examples, aspects of the operations of 1520 may be performed by a reference signal transmitting component as described with reference to FIGS. 6 through 9.

Figure 16:
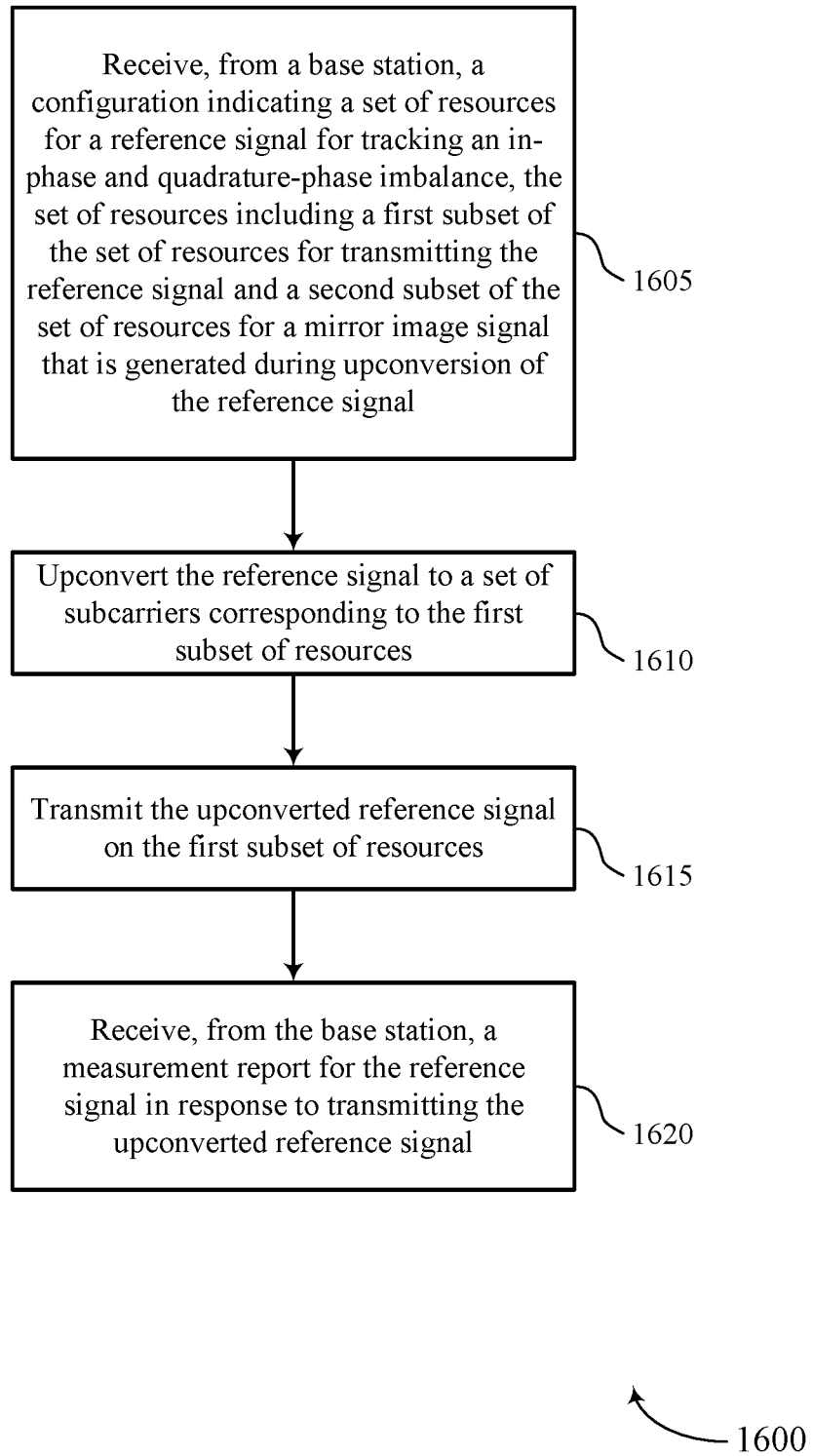

FIG. 16 shows a flowchart illustrating a method 1600 that supports an in-phase and quadrature-phase tracking reference signal for an uplink shared channel in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal. The operations of 1605 may be performed according to the methods described herein. In some examples, aspects of the operations of 1605 may be performed by a resource configuration component as described with reference to FIGS. 6 through 9.

At 1610, the UE may upconvert the reference signal to a set of subcarriers corresponding to the first subset of resources. The operations of 1610 may be performed according to the methods described herein. In some examples, aspects of the operations of 1610 may be performed by an upconverting component as described with reference to FIGS. 6 through 9.

At 1615, the UE may transmit the upconverted reference signal on the first subset of resources. The operations of 1615 may be performed according to the methods described herein. In some examples, aspects of the operations of 1615 may be performed by a reference signal transmitting component as described with reference to FIGS. 6 through 9.

At 1620, the UE may receive, from the base station, a measurement report for the reference signal in response to transmitting the upconverted reference signal. The operations of 1620 may be performed according to the methods described herein. In some examples, aspects of the operations of 1620 may be performed by a measurement report component as described with reference to FIGS. 6 through 9.

Figure 17:
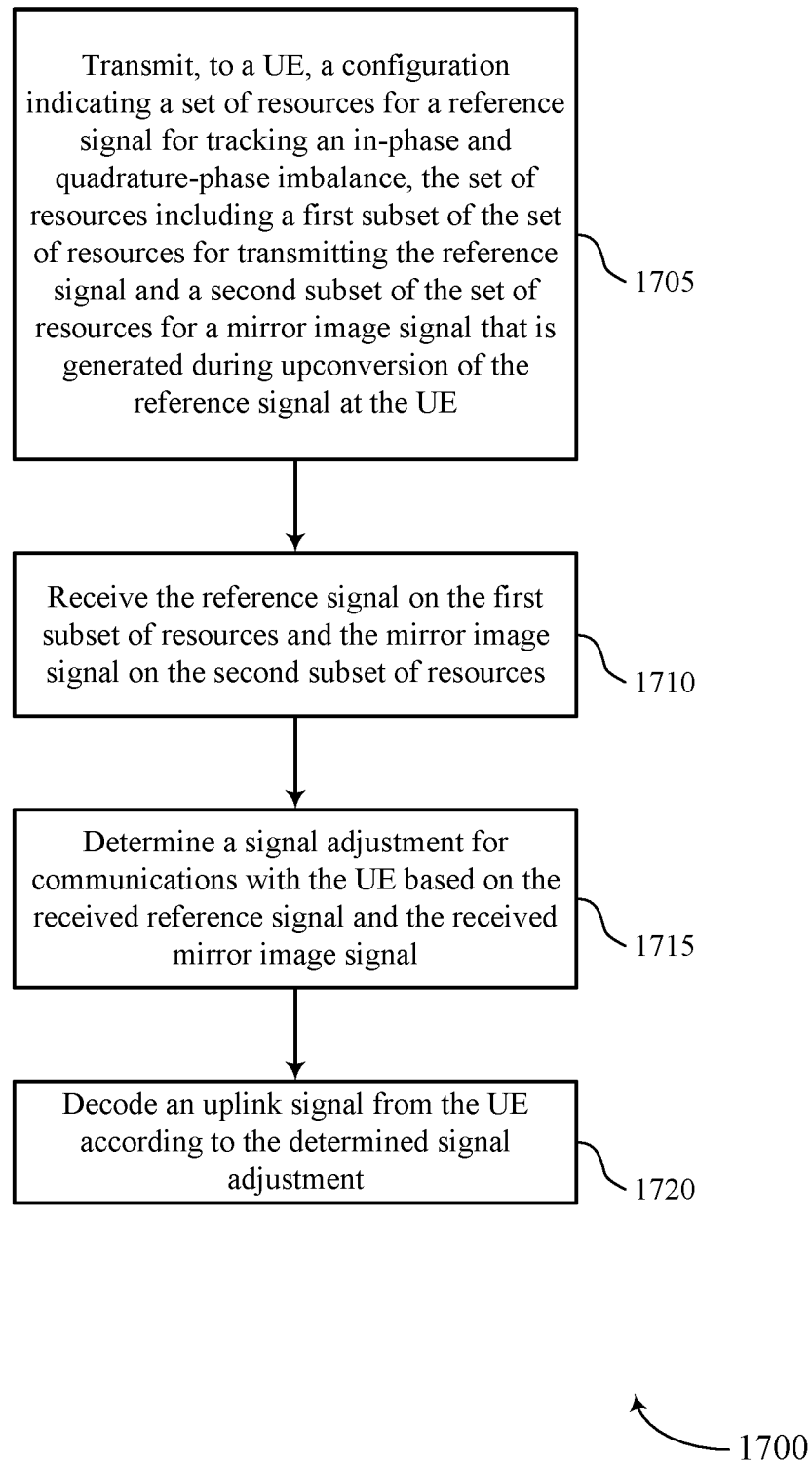

FIG. 17 shows a flowchart illustrating a method 1700 that supports an in-phase and quadrature-phase tracking reference signal for an uplink shared channel in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE. The operations of 1705 may be performed according to the methods described herein. In some examples, aspects of the operations of 1705 may be performed by a resource configuration component as described with reference to FIGS. 10 through 13.

At 1710, the base station may receive the reference signal on the first subset of resources and the mirror image signal on the second subset of resources. The operations of 1710 may be performed according to the methods described herein. In some examples, aspects of the operations of 1710 may be performed by a reference signal receiving component as described with reference to FIGS. 10 through 13.

At 1715, the base station may determine a signal adjustment for communications with the UE based on the received reference signal and the received mirror image signal. The operations of 1715 may be performed according to the methods described herein. In some examples, aspects of the operations of 1715 may be performed by a signal adjustment component as described with reference to FIGS. 10 through 13.

At 1720, the base station may decode an uplink signal from the UE according to the determined signal adjustment. The operations of 1720 may be performed according to the methods described herein. In some examples, aspects of the operations of 1720 may be performed by a decoding component as described with reference to FIGS. 10 through 13.

Figure 18:
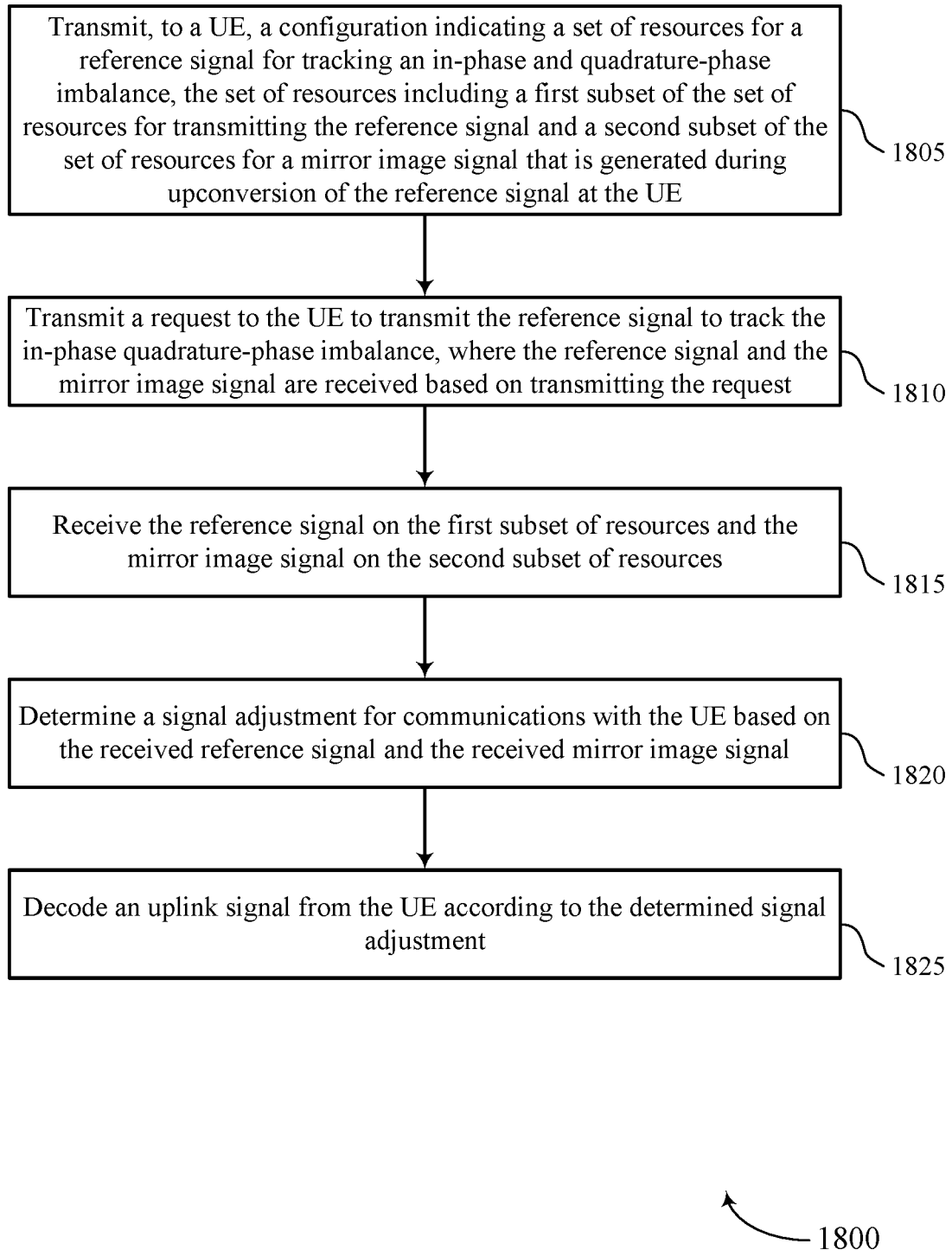

FIG. 18 shows a flowchart illustrating a method 1800 that supports an in-phase and quadrature-phase tracking reference signal for an uplink shared channel in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE. The operations of 1805 may be performed according to the methods described herein. In some examples, aspects of the operations of 1805 may be performed by a resource configuration component as described with reference to FIGS. 10 through 13.

At 1810, the base station may transmit a request to the UE to transmit the reference signal to track the in-phase quadrature-phase imbalance, where the reference signal and the mirror image signal are received based on transmitting the request. The operations of 1810 may be performed according to the methods described herein. In some examples, aspects of the operations of 1810 may be performed by a reference signal trigger component as described with reference to FIGS. 10 through 13.

At 1815, the base station may receive the reference signal on the first subset of resources and the mirror image signal on the second subset of resources. The operations of 1815 may be performed according to the methods described herein. In some examples, aspects of the operations of 1815 may be performed by a reference signal receiving component as described with reference to FIGS. 10 through 13.

At 1820, the base station may determine a signal adjustment for communications with the UE based on the received reference signal and the received mirror image signal. The operations of 1820 may be performed according to the methods described herein. In some examples, aspects of the operations of 1820 may be performed by a signal adjustment component as described with reference to FIGS. 10 through 13.

At 1825, the base station may decode an uplink signal from the UE according to the determined signal adjustment. The operations of 1825 may be performed according to the methods described herein. In some examples, aspects of the operations of 1825 may be performed by a decoding component as described with reference to FIGS. 10 through 13.

The following provides an overview of aspects of the present disclosure:

Aspect 1: A method for wireless communication at a UE, comprising: receiving, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal; upconverting the reference signal to a set of subcarriers corresponding to the first subset of the set of resources; and transmitting the upconverted reference signal on the first subset of the set of resources.

Aspect 2: The method of aspect 1, further comprising: receiving a request from the base station to transmit the reference signal to track the in-phase and quadrature-phase imbalance, the upconverted reference signal transmitted based at least in part on receiving the request.

Aspect 3: The method of aspect 2, wherein the received request configures the UE to transmit the reference signal based at least in part on an uplink demodulation reference signal configuration.

Aspect 4: The method of any of aspects 1 through 3, further comprising: detecting a periodic trigger to transmit the reference signal to track the in-phase and quadrature-phase imbalance, the upconverted reference signal transmitted based at least in part on detecting the periodic trigger.

Aspect 5: The method of any of aspects 1 through 4, further comprising: receiving, from the base station, a measurement report for the reference signal in response to transmitting the upconverted reference signal.

Aspect 6: The method of aspect 5, further comprising: adjusting an antenna array of the UE or modifying a phase and amplitude in time domain processing, or both, based at least in part on the measurement report to compensate for the in-phase and quadrature-phase imbalance.

Aspect 7: The method of any of aspects 1 through 6, wherein the received configuration indicates a continuous allocation of frequency resources for the reference signal in the first subset of the set of resources, and a lack of frequency resources for the reference signal in the second subset of the set of resources.

Aspect 8: The method of any of aspects 1 through 7, wherein the set of resources comprises resources for a demodulation reference signal, the first subset of the set of resources comprises a first portion of demodulation reference signal resources in an uplink channel and the second subset of the set of resources comprises a second portion of the demodulation reference signal resources in the uplink channel.

Aspect 9: The method of aspect 8, wherein the first subset of the set of resources is centered around an odd frequency offset.

Aspect 10: The method of aspect 9, wherein the first subset of the set of resources are interleaved with the second subset of the set of resources.

Aspect 11: The method of any of aspects 1 through 10, wherein the reference signal is asymmetrical around a local oscillator frequency of the UE.

Aspect 12: The method of any of aspects 1 through 11, wherein the upconverted reference signal is transmitted on the first subset of the set of resources using a plurality of antenna ports.

Aspect 13: A method for wireless communication at a base station, comprising: transmitting, to a UE, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal at the UE; receiving the reference signal on the first subset of the set of resources and the mirror image signal on the second subset of the set of resources; determining a signal adjustment for communications with the UE based at least in part on the received reference signal and the received mirror image signal; and decoding an uplink signal from the UE according to the determined signal adjustment.

Aspect 14: The method of aspect 13, further comprising: transmitting a request to the UE to transmit the reference signal to track the in-phase quadrature-phase imbalance, wherein the reference signal and the mirror image signal are received based at least in part on transmitting the request.

Aspect 15: The method of aspect 14, wherein the transmitted request configures the UE to transmit the reference signal based at least in part on an uplink demodulation reference signal configuration.

Aspect 16: The method of any of aspects 13 through 15, further comprising: transmitting, to the UE, an indication of a periodic trigger for the UE to use to transmit the reference signal to track the in-phase and quadrature-phase imbalance, wherein the reference signal and the mirror image signal are received based at least in part on the periodic trigger.

Aspect 17: The method of any of aspects 13 through 16, further comprising: transmitting a measurement report for the reference signal in response to receiving the reference signal and the mirror image signal.

Aspect 18: The method of any of aspects 13 through 17, further comprising: adjusting an antenna array of the base station or a phase and amplitude processing in the time domain, or both, based at least in part on the signal adjustment to compensate for the in-phase and quadrature-phase imbalance.

Aspect 19: The method of any of aspects 13 through 18, further comprising: applying the signal adjustment after a Fast Fourier Transform and prior to channel estimation.

Aspect 20: The method of any of aspects 13 through 19, further comprising: performing a channel estimation based at least in part on the received mirror image signal, wherein the signal adjustment is based at least in part on the channel estimation.

Aspect 21: The method of aspect 20, further comprising: combining signals received at antennas of the base station associated with the UE prior to performing the channel estimation.

Aspect 22: The method of aspect 21, wherein the signals are combined based at least in part on a signal to noise ratio (SNR) of the signals.

Aspect 23: The method of any of aspects 13 through 22, wherein the transmitted configuration indicates a continuous allocation of frequency resources for the reference signal in the first subset of the set of resources, and a lack of any frequency resources for the reference signal in the second subset of the set of resources.

Aspect 24: The method of any of aspects 13 through 23, wherein the set of resources comprises resources for a demodulation reference signal, the first subset of the set of resources comprises a first portion of demodulation reference signal resources in an uplink channel and the second subset of the set of resources comprises a second portion of the demodulation reference signal resources in the uplink channel.

Aspect 25: The method of aspect 24, wherein the first subset of the set of resources is centered around an odd frequency offset.

Aspect 26: The method of aspect 25, wherein the first subset of the set of resources are interleaved with the second subset of the set of resources.

Aspect 27: The method of any of aspects 13 through 26, wherein the reference signal is asymmetrical around a local oscillator frequency of the UE.

Aspect 28: An apparatus for wireless communication at a UE, comprising a processor; memory coupled with the processor; and instructions stored in the memory and executable by the processor to cause the apparatus to perform a method of any of aspects 1 through 12.

Aspect 29: An apparatus for wireless communication at a UE, comprising at least one means for performing a method of any of aspects 1 through 12.

Aspect 30: A non-transitory computer-readable medium storing code for wireless communication at a UE, the code comprising instructions executable by a processor to perform a method of any of aspects 1 through 12.

Aspect 31: An apparatus for wireless communication at a base station, comprising a processor; memory coupled with the processor; and instructions stored in the memory and executable by the processor to cause the apparatus to perform a method of any of aspects 13 through 27.

Aspect 32: An apparatus for wireless communication at a base station, comprising at least one means for performing a method of any of aspects 13 through 27.

Aspect 33: A non-transitory computer-readable medium storing code for wireless communication at a base station, the code comprising instructions executable by a processor to perform a method of any of aspects 13 through 27.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal;
   upconverting the reference signal to a set of subcarriers corresponding to the first subset of the set of resources; and
   transmitting the upconverted reference signal on the first subset of the set of resources.

2. The method of claim 1, further comprising:
   receiving a request from the base station to transmit the reference signal to track the in-phase and quadrature-phase imbalance, the upconverted reference signal transmitted based at least in part on receiving the request.

3. The method of claim 2, wherein the received request configures the UE to transmit the reference signal based at least in part on an uplink demodulation reference signal configuration.

4. The method of claim 1, further comprising:
   detecting a periodic trigger to transmit the reference signal to track the in-phase and quadrature-phase imbalance, the upconverted reference signal transmitted based at least in part on detecting the periodic trigger.

5. The method of claim 1, further comprising:
   receiving, from the base station, a measurement report for the reference signal in response to transmitting the upconverted reference signal.

6. The method of claim 5, further comprising:
   adjusting an antenna array of the UE or modifying a phase and amplitude in time domain processing, or both, based at least in part on the measurement report to compensate for the in-phase and quadrature-phase imbalance.

7. The method of claim 1, wherein the received configuration indicates a continuous allocation of frequency resources for the reference signal in the first subset of the set of resources, and a lack of frequency resources for the reference signal in the second subset of the set of resources.

8. The method of claim 1, wherein the set of resources comprises resources for a demodulation reference signal, wherein the first subset of the set of resources comprises a first portion of demodulation reference signal resources in an uplink channel and the second subset of the set of resources comprises a second portion of the demodulation reference signal resources in the uplink channel.

9. The method of claim 8, wherein the first subset of the set of resources is centered around an odd frequency offset.

10. The method of claim 9, wherein the first subset of the set of resources are interleaved with the second subset of the set of resources.

11. The method of claim 1, wherein the reference signal is asymmetrical around a local oscillator frequency of the UE.

12. The method of claim 1, wherein the upconverted reference signal is transmitted on the first subset of the set of resources using a plurality of antenna ports.

13. An apparatus for wireless communication at a user equipment (UE), comprising:

a processor, memory coupled with the processor; and instructions stored in the memory and executable by the processor to cause the apparatus to:

receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal;

upconvert the reference signal to a set of subcarriers corresponding to the first subset of the set of resources; and transmit the upconverted reference signal on the first subset of the set of resources.

14. The apparatus of claim 13, wherein the instructions are further executable by the processor to cause the apparatus to:

receive a request from the base station to transmit the reference signal to track the in-phase and quadrature-phase imbalance, the upconverted reference signal transmitted based at least in part on receiving the request.

15. The apparatus of claim 14, wherein the received request configures the UE to transmit the reference signal based at least in part on an uplink demodulation reference signal configuration.

16. The apparatus of claim 13, wherein the instructions are further executable by the processor to cause the apparatus to:

detect a periodic trigger to transmit the reference signal to track the in-phase and quadrature-phase imbalance, the upconverted reference signal transmitted based at least in part on detecting the periodic trigger.

17. The apparatus of claim 13, wherein the instructions are further executable by the processor to cause the apparatus to:

receive, from the base station, a measurement report for the reference signal in response to transmitting the upconverted reference signal.

18. The apparatus of claim 17, wherein the instructions are further executable by the processor to cause the apparatus to:

adjust an antenna array of the UE or modifying a phase and amplitude in time domain processing, or both, based at least in part on the measurement report to compensate for the in-phase and quadrature-phase imbalance.

19. The apparatus of claim 13, wherein the received configuration indicates a continuous allocation of frequency resources for the reference signal in the first subset of the set of resources, and a lack of frequency resources for the reference signal in the second subset of the set of resources.

20. The apparatus of claim 13, wherein:

the set of resources comprises resources for a demodulation reference signal, the first subset of the set of resources comprises a first portion of demodulation reference signal resources in an uplink channel and the second subset of the set of resources comprises a second portion of the demodulation reference signal resources in the uplink channel.

21. The apparatus of claim 20, wherein the first subset of the set of resources is centered around an odd frequency offset.

22. The apparatus of claim 21, wherein the first subset of the set of resources are interleaved with the second subset of the set of resources.

23. The apparatus of claim 13, wherein the reference signal is asymmetrical around a local oscillator frequency of the UE.

24. The apparatus of claim 13, wherein the upconverted reference signal is transmitted on the first subset of the set of resources using a plurality of antenna ports.

25. An apparatus for wireless communication at a user equipment (UE), comprising:

means for receiving, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal;

means for upconverting the reference signal to a set of subcarriers corresponding to the first subset of the set of resources; and means for transmitting the upconverted reference signal on the first subset of the set of resources.

26. The apparatus of claim 25, further comprising:

means for receiving a request from the base station to transmit the reference signal to track the in-phase and quadrature-phase imbalance, the upconverted reference signal transmitted based at least in part on receiving the request.

27. The apparatus of claim 26, wherein the received request configures the UE to transmit the reference signal based at least in part on an uplink demodulation reference signal configuration.

28. The apparatus of claim 25, further comprising:

means for detecting a periodic trigger to transmit the reference signal to track the in-phase and quadrature-phase imbalance, the upconverted reference signal transmitted based at least in part on detecting the periodic trigger.

29. The apparatus of claim 25, further comprising:

means for receiving, from the base station, a measurement report for the reference signal in response to transmitting the upconverted reference signal.

30. A non-transitory computer-readable medium storing code for wireless communication at a user equipment (UE), the code comprising instructions executable by a processor to:

receive, from a base station, a configuration indicating a set of resources for a reference signal for tracking an in-phase and quadrature-phase imbalance, the set of resources including a first subset of the set of resources for transmitting the reference signal and a second subset of the set of resources for a mirror image signal that is generated during upconversion of the reference signal;

upconvert the reference signal to a set of subcarriers corresponding to the first subset of the set of resources; and transmit the upconverted reference signal on the first subset of the set of resources.

* * * * *